US008595080B2

(12) United States Patent
Savilia et al.

(10) Patent No.: US 8,595,080 B2
(45) Date of Patent: Nov. 26, 2013

(54) SYSTEMS AND METHODS FOR A CENTRALIZED GIFT REGISTRY WITH TWO-WAY SYNCHRONIZATION

(75) Inventors: Kristin Savilia, Bedford, NH (US); Marshall Greer, Seattle, WA (US); Janine Esposito, Irvington, NY (US); Shari Cohen, Hoboken, NJ (US)

(73) Assignee: XO Group Inc., New York, NY (US)

( * ) Notice: Subject to any disclaimer, the term of this patent is extended or adjusted under 35 U.S.C. 154(b) by 467 days.

(21) Appl. No.: 12/757,413

(22) Filed: Apr. 9, 2010

(65) Prior Publication Data

US 2011/0251923 A1  Oct. 13, 2011

(51) Int. Cl.
*G06Q 30/00*  (2012.01)

(52) U.S. Cl.
USPC ......................................... 705/26.1

(58) Field of Classification Search
USPC ......................................... 705/26.1
See application file for complete search history.

(56) References Cited

U.S. PATENT DOCUMENTS

| 5,754,981 | A  | 5/1998  | Veeneman et al. |
| 5,774,874 | A  | 6/1998  | Veeneman et al. |
| 5,809,481 | A  | 9/1998  | Baron et al. |
| 5,826,242 | A  | 10/1998 | Montulli |
| 5,845,293 | A  | 12/1998 | Veghte et al. |
| 5,884,035 | A  | 3/1999  | Butman et al. |
| 5,884,270 | A  | 3/1999  | Walker et al. |
| 5,898,594 | A  | 4/1999  | Leason et al. |
| 5,948,054 | A  | 9/1999  | Nielsen |
| 5,953,400 | A  | 9/1999  | Rosenthal et al. |
| 5,970,474 | A  | 10/1999 | LeRoy et al. |
| 5,978,813 | A  | 11/1999 | Foltz et al. |
| 6,055,573 | A  | 4/2000  | Gardenswartz et al. |
| 6,138,106 | A  | 10/2000 | Walker et al. |
| 6,154,745 | A  | 11/2000 | Kari et al. |
| 6,246,997 | B1 | 6/2001  | Cybul et al. |
| 6,347,398 | B1 | 2/2002  | Parthasarathy et al. |
| 6,363,497 | B1 | 3/2002  | Chrabaszcz |
| 6,381,594 | B1 | 4/2002  | Eichstaedt et al. |
| 6,490,602 | B1 | 12/2002 | Kraemer |
| 6,493,742 | B1 | 12/2002 | Holland et al. |
| 6,499,052 | B1 | 12/2002 | Hoang et al. |
| 6,556,975 | B1 | 4/2003  | Wittsche |

(Continued)

OTHER PUBLICATIONS

"Felicite lets you register All your gifts in one place", Felicite.com, Oct. 13, 1999, retrieved from http://web.archive.org/web/19991013103545/http://felicite.com/.

(Continued)

*Primary Examiner* — Mila Airapetian
(74) *Attorney, Agent, or Firm* — Ropes & Gray LLP

(57) ABSTRACT

Systems and methods for that allow for the creation and management of a centralized gift registry are described. Gifts are added to the centralized gift registry from retailer-specific registries. A gift list is created and displayed. Gift givers may select a gift from the gift list of the centralized gift registry. In one embodiment, when a purchase of a gift occurs, the gift list is updated. Updates to gifts are sent between the centralized gift registry and the retailer-specific registries, such that the gifts common to these registries are synchronized. This synchronization may involve the use of APIs at the centralized gift registry or the retailer-specific registries. The centralized gift registry system automatically searches for all retailer-specific registries pertaining to the gift registrant. The centralized gift registry system may request a retailer's system to create a retailer-specific registry.

44 Claims, 24 Drawing Sheets

(56) References Cited

U.S. PATENT DOCUMENTS

| | | | |
|---|---|---|---|
| 6,609,106 B1 | 8/2003 | Robertson | |
| 6,618,753 B2 | 9/2003 | Holland et al. | |
| 7,013,292 B1 | 3/2006 | Hsu et al. | |
| 2005/0033650 A1 | 2/2005 | Robertson | |
| 2005/0038712 A1 | 2/2005 | Veeneman | |
| 2005/0091120 A1* | 4/2005 | Auletta | 705/26 |
| 2008/0059332 A1 | 3/2008 | Holland et al. | |
| 2008/0183676 A1* | 7/2008 | Holland et al. | 707/3 |
| 2010/0114957 A1 | 5/2010 | Benson et al. | |

OTHER PUBLICATIONS

"Designing for Women: Low-Tech, Practical Web Sites", Katherine Cavanaugh, May 13, 1996: retrieved from is.gseis.ucla.edu/impact/w96/News/News9/0313wedding.html on Jul. 2, 2003.

"Macys Weddingline: Macy's launches on-line access to nationwide bridal registry; database includes 200,000 listings from 170 stores, joins previously introduced "Weddingline"", Byline: Business and Feature Editors/Technology and Retail Writers, San Francisco, Jun. 27, 1996.

"WeddingChannel.com Obtains Investment from MSD Capital", Press Release : The WeddingChannel, Mar. 15, 1999, retrieved from www.weddingchannel.com on Jul. 2, 2003.

"WedingChannel.com Crosses the Threshold With Nw Planning Tools and E-Commerce Initiatives", Press Release : The WeddingChannel, May 25, 1999, retrieved from www.weddingchannel.com on Jul. 2, 2003.

"Federated Department Stores Partners with WeddingChannel.com to Establish Nation's Largest Integrated In-Store and Online Bridal Registry", Press Release : The WeddingChannel, May 25, 1999, retrieved from www.weddingchannel.com on Jul. 2, 2003.

"Della & James Launces Online Gift Registry, Brining Together Wedding Registries of Premier Retailers", Press Release : The WeddingChannel, Jun. 10, 1999, retrieved from www.weddingchannel.com on Jul. 2, 2003.

"WeddingChannel.com and Federated Launch Integrated Registry with More than 330,000 Couples", Press Release : The WeddingChannel, Sep. 14, 1999, retrieved from www.weddingchannel.com on Jul. 2, 2003.

"Della & James Secures Financing frim Leading Retailers Including Amazon.com, Neiman Marcus, Crate & Barrell and Williams-Sonoma", Press Release : The WeddingChannel, Sep. 23, 1999, retrieved from www.weddingchannel.com on Jul. 2, 2003.

"WeddingChannel.com Named GO Network Premier Wedding Content Partner", Press Release : The WeddingChannel, Sep. 29, 1999, retrieved from www.weddingchannel.com on Jul. 2, 2003.

"Soul Food to String Quartets: WeddingChannel.com Expands Cultural Content with Expert Linnyette Richardson-Hall", Press Release : The WeddingChannel, Dec. 7, 1999, retrieved from www.weddingchannel.com on Jul. 2, 2003.

Wish-Llist.com, dated May 8, 1999 . retrieved from www.Archive.org on Dec. 3, 2009.

"Wedding Bells Ring for Cyber-Matrimony Super-Site", Press Release : The WeddingChannel, Apr. 14, 1997, retrieved from www.weddingchannel.com on Jul. 2, 2003.

"The Wedding Channel Unites with Worldview Systems and Internet Travel Network to Make Honeymoon Planning Easier and More Convenient Than Ever", Press Release : The WeddingChannel, May 27, 1997, retrieved from www.weddingchannel.com on Jul. 2, 2003.

"The WeddingChannel and Vicinity Connect Couples with Wedding Businesses Nationwide", Press Release : The WeddingChannel, Jun. 9, 1997, retrieved from www.weddingchannel.com on Jul. 2, 2003.

"Wedding 411", retrieved from wedding411.com/ifb on Apr. 22, 1998.

"Wedding 411-WebPlace" retrieved from wedding411.com/wp/wp-----index.cfm, on Apr. 22, 1998.

"TheGift.com—On-line gift shop and wedding registry. Large gift section", retrieved from thegift.com/welcome.htm on Apr. 22, 1998.

"The Wedding Network—Information", retrieved from wedreg.com/information/FAQ.html on accessed Apr. 22, 1998.

"Welcome to the Wedding Network", retrieved from wedreg.com/WO/WebObject on May 13, 1998.

"Sample Wedding Page", retrieved from thegift.com/sampleinfo.htm on May 13, 1998.

"Couples Services" retrieved from website.net/coupleservices/index.htm on May 14, 1998.

"Wedding 411—WebPlace, Personalized Wedding Planning" retrieved from wedding411.com/wp/wp----index.cfm on Jul. 2, 1998.

"What is Our Wedding?" retrieved from Weddingchannel.com on Jul. 2, 1998.

"Goin' to the Web, and I'm gonna get married", Meg Mitchell, Editor & Publisher, Sep. 1998, p. 29 (4 pages) retrieved from http://proquest.umi.com (Proquest# 34658050) on Apr. 11, 2005.

"Plugged in (Rockies Edition 1)", Denver Post, Denver, CO, Apr. 6, 1998, p. C.09; retrieved from http://proquest.umi.com (Proquest# 28627643) on Apr. 11, 2005.

"Major Internet Service Providers Raising Fees, Limiting Users' Hours", The Plain Dealer, Cleveland, OH, Apr. 6, 1998, p. 6.C: retrieved from http://proquest.umi.com (Proquest# 28456661) on Apr. 11, 2005.

"Happy Couple May Now Click for Their Gifts", New York Times (Late Edition (East Coast)), New York, NY, Apr. 2, 1998, p. 4 retrieved from http://proquest.umi.com (Proquest# 28324598) on Apr. 11, 2005.

"Bridalnet Brings Fashion, Beauty and "Hip" Perspectives to WeddingChannel, The Ultimate Online Wedding Resource", Press Release : The WeddingChannel, Jun. 9, 1997.

"Primedia's Modern Bride Forms a Joint Venture and Invests in Web-Based Gift Registry Company, Internet Gift Registries", Press Release : Primedia Inc., Mar. 16, 1998, retrieved from www.primediainc.com/news/98.03.16.html on Apr. 22, 1998.

Notice of Allowance dated Mar. 4, 2013 for U.S. Appl. No. 13/494,603.

* cited by examiner

We found these registries, would you like to upload and merge with your Gift Registry? — 902
— 900
— 904

| Registrant | Co-Registrant | Retailer | Location | Event Date | Import list |
|---|---|---|---|---|---|
| Esposito | Mickey Mouse | Macy's | NY | September 15, 2009 | ☐ |
| Esposito | Mickey Mouse | Target | NY | September 15, 2009 | ☐ |
| Esposito | Mickey Mouse | Amazon | NY | September 15, 2009 | ☐ |
| Esposito | Mickey Mouse | Pottery Barn | NY | September 15, 2009 | |

— 906

☑ Allow Registry and Retailers to send status and added items to keep Registry in-sync at all times.

[ Import ] — 908

Created a registry in-store, but don't see it listed above? Try using our search below. — 910

| First Name | Last Name |
|---|---|
| Mickey | Mouse |
| April ▸ | 2009 ▸ |

[ Find my registries ] — 912

FIG. 9

My Registry — 1106
Personal Settings — 1107
Manage my lists
-Wedding
-Create a new list — 1108
Manage my Styleboards
-Living Room
-Kitchen
Tools — 1110
Import Registry
Add from anywhere
Announcement Cards
Find a Registry — 1112
Add Products
By Category
By Retailer
By Room & Color
Add a cash gift

1104

1130 — 1100 — 1102 — 1109

Esposito's & Mickey's Wedding Registry List

Sort by: Last added ▷

Product Name   Priority: High   Requested: 1   Comments here — 1124
$49.99                                          Save
Crate & Barrel                                  Delete this item
Select a list   Visibility: Public              Tags: — 1114
Wedding ▷                                       Kitchen, Appliances Explore by Tags
Kitchen
Appliances — 1116

Product Name   Priority: High   Requested: 1   Comments: Needed for my annual holiday baking.   Edit this item
$49.99                                                                                          Rate it
Crate and Barrel                                                                                Email to a friend
List: Wedding   Visibility: Public   Received: 0   Tags: Kitchen, Appliances                    Buy it Explore by Category
Kitchen
Bath — 1118

Explore by Price
$0-$25
$25-$50
$50-$100
$100 over — 1120

Product Name   Priority: High   Requested: 1   Comments: Needed for my annual holiday baking.   Edit this item
$49.99                                                                                          Rate it
Crate and Barrel                                                                                Email to a friend
List: Wedding   Visibility: Public   Received: 0   Tags: Kitchen, Appliances                    Buy it 1130
Explore by Priority
High
Medium
Low — 1122

Product Name   Priority: High   Requested: 1   Comments: Needed for my annual holiday baking.   Edit this item
$49.99                                                                                          Rate it
Crate and Barrel                                                                                Email to a friend
List: Wedding   Visibility: Public   Received: 0   Tags: Kitchen, Appliances                    Buy it Explore by Status
Purchased
Not purchased — 1128

Add Cash Gift — 1202

○ Open a cash gift fund to tastefully request cash. You can name your cash gift fund (e.g., Our Honeymoon Fund, Our Couch Fund). Everyone can contribute and know that their gift is going towards something special. Your fund is totally secure. — 1201

Select a list: [Wedding ▷] — 1204

Cash Gift Fund Name: [          ] — 1206

Price: [$500.00]   If you do not want to enter a specific dollar amount, they can indicate "Any contribution acceptable." — 1208

Priority: [High ▷] — 1210

Visibility: [Public ▷]

Tags: [          ] — 1212

Comments: [          ]

• Enter Email
• Use my account for contributions — 1214

Don't have an account? Click here

[Add to My List] — 1216

| | | | | |
|---|---|---|---|---|
| Sort by: | Retailer | Priority | Price | Status |
| Filter list instantly | | | | |
| ▼ Retailer(s) | [image] Buy It | Product Name $49.99 Crate and Barrel Added January 25, 2009 | Priority: High | Requested: 1 Received: 0 | Comments: Much needed for my annual holiday baking. |
| ☑ Crate & Barrel ☑ Macys ☑ Bloomingdales | | | | |
| ▼ Category | $$ Couch Fund Cash Gift – Any Denom- ination Contribute $$ | CASH GIFT $Any contribution accepted Added January 25, 2009 | Priority: High | Requested: 1 Received: 0 | Comments: We would like to buy a couch for our living room. |
| ☑ Kitchen ☑ Home Decor ☑ Bed ☐ Bath ☐ Fine Dining ☐ Garden | | | | |
| ▼ Room | [image] Buy It | Product Name $49.99 Crate and Barrel | Priority: High | Requested: 1 Received: 0 | Comments: Much needed for my annual holiday baking. |
| ☑ Kitchen ☑ Bathroom ☑ Living Room ☐ Dining Room ☐ Yard ☐ Bedroom | | | | |
| ▼ Price Range $0-$25 $25-$50 $50 over | | | | |
| ▼ Priority ☑ High ☐ Medium ☐ Low | | | | |

FIG. 12B

SYSTEMS AND METHODS FOR A CENTRALIZED GIFT REGISTRY WITH TWO-WAY SYNCHRONIZATION

BACKGROUND

This disclosure relates generally to the field of gift registries. More particularly, this disclosure relates to systems and methods for merging and managing gift registries.

Gift registries are known and used in a number of different markets, with the most common area being wedding registries. Gift registries may also be referred to as wish lists. Gift registries include a list of gift items (or gifts) that a gift registrant desires. Gift registrants may also be referred to as gift recipients. The advent of widespread access to communications networks such as the Internet has led to the development of web applications capable of accessing gift registries. Some gift registries are associated with an event. An event may be, for example, an engagement, wedding, anniversary, birthday, graduation, religious holiday, baby shower, baptism, confirmation, Mother's day, Father's day, or any other significant event. Such gift registries may, in addition to gift information, have event information such as type and date of an event.

Retailers that provide registry services (hosted at their own servers or by third party servers over a communications network such as the Internet) typically restrict the content of their "retailer-specific" (gift) registries to products offered by the retailer. Thus, gift registrants for major events, such as weddings, must still register with several different retailers in order to create such retailer-specific registries in order to obtain all their desired gifts. Often gift registrants are not satisfied with the scope of their selections even after creating several different retailer-specific registries. In fact, the typical gift registrant does not create more retailer-specific registries because of the burden it places on guests and because of the high degree of effort required, e.g., in updating gifts on each retailer-specific registry, to maintain such a large number of retailer-specific registries. Even with the introduction of Internet-accessible gift registries, retailer-specific gift registries require gift givers attempting to buy gifts for gift registrants to search multiple retailer-specific web sites. Such an inconvenience is magnified when the gift giver does not know where the gift registrant is registered.

A multi-retailer registry is one in which the gift list of the gift registry is a combination of gifts from a plurality of retailers. The multi-retailer registry may be created, for example, by a gift registrant manually entering large amounts of information, such as a gift descriptions, prices, and possible retailers where the gift items can be found. In this respect, multi-retailer registries are quite unsatisfactory. First, because the gift registrant must manually enter large amounts of information, multi-retailer registries are not gift registrant-friendly. Second, because multi-retailer registries are generally not associated with particular retailers; they do not receive any communication from a respective retailer. Without retailer communication, the multi-retailer registry is not updated, e.g., when purchases are made. Thus, gift givers and/or gift registrants must diligently update the multi-retailer registry themselves, e.g., after making changes to a gift item or making a purchase from a retailer-specific registry.

SUMMARY

It is an objective of the present disclosure to provide systems and methods for a centralized gift registry system. The centralized gift registry includes gift items from at least one retailer-specific registry. A retailer-specific registry whose items have been merged into the gift list of the centralized gift registry system is also referred to as an "associated" retailer-specific registry, i.e., the centralized gift registry is associated with the respective retailer-specific registry. For example, gifts may be merged into the gift list of the centralized gift registry from existing retailer-specific gift registries (e.g., for retailers such as MACY'S, TARGET, etc.). In some embodiments, the centralized gift registry may also include gifts added from a retailer's catalog (e.g., using a centralized gift registry "Add from Anywhere" feature). In some embodiments, the centralized gift registry may also include gifts added from the centralized gift registry's catalog of gift items.

In some embodiments, a centralized gift registry system may include a centralized gift registry of a gift registrant. The centralized gift registry itself may include a gift common between the centralized gift registry and a retailer-specific registry. The centralized gift registry system may also include a memory for storing the centralized gift registry, and a network interface for communicating with a communications network. The communications network is accessible to at least one retailer-specific registry, a gift giver and the gift registrant. The centralized gift registry system may also include a processor in communication with the memory and the network interface.

In some embodiments, the centralized gift registry system is configured such that automatic synchronization of gifts that are common to the centralized gift registry and the retailer-specific registries occurs in near real-time or at periodic intervals. Synchronization may include the propagation of updates to gift items common to a centralized gift registry and a retailer-specific gift registry. These updates may be required when, for example, a gift giver purchases a gift or a gift registrant updates the desired quantity for a gift. For example, in some embodiments, the processor of the centralized gift registry system may be configured to receive, e.g., over a communications network, an update to a gift of the centralized gift registry from a gift giver, a gift registrant or at least one retailer-specific registry system. The processor of the centralized gift registry system may also be configured to send, e.g., over the communications network, an update to a gift from the centralized gift registry system to the at least one retailer-specific registry system. An update includes at least one of a change in the desired quantity of the gift, a decrease in the desired quantity of the gift responsive to a purchase request, a deletion of a gift from the centralized or retailer-specific gift registry, and an addition of a gift to the centralized or retailer-specific gift registry. The processor may also be configured to modify the centralized gift registry to include the update to the gift. In this manner, the gift items common to the at least one retailer-specific registry and the centralized gift registry is synchronized. This process may be referred to as "linking and syncing" the retailer-specific registry with the centralized gift registry. The synchronization may occur in near real-time or periodically. The synchronization period may be any suitable period, e.g., between every two minutes and every 24 hours.

In some embodiments, the synchronization of gifts may be performed using an Application Programming Interface (API) of the centralized gift registry system and/or a retailer system's API configured to allow the exchange of data between the centralized registry and the retailer-specific registries. For example, the processor of the centralized gift registry system may send a request via an API function call to the retailer-specific registry system. In some embodiments, a gift giver or a gift registrant may search for and/or filter the gift items in the centralized gift registry. The search and/or filter operations may be performed across a broad range of categories including, e.g., by retailer, by category (e.g., kitchen, bedroom, bathroom), and by price.

In some embodiments, when the purchase of a gift item or other update to the retailer-specific registry occurs, the centralized gift registry is updated and gift item updates are sent to the retailers and/or existing retailer-specific registry hosts to update their respective registries. These updates may be sent by generating and transmitting a request from the centralized gift registry system to the retailer-specific registry system's API.

In some embodiments, when a gift registrant accesses the centralized gift registry, the centralized gift registry system automatically searches for all retailer online and retailer store registries pertaining to the gift registrant. The gift items from the detected retailer-specific registries are then uploaded and merged (i.e., imported) into the gift list of the centralized gift registry. In some embodiments, the processor of the centralized gift registry may be configured to receive a request from the gift registrant to import a retailer-specific registry for the gift registrant into the centralized gift registry. In other embodiments, the processor may automatically (i.e., without a request from the gift registrant) import a retailer-specific registry for the gift registrant into the centralized gift registry. The processor of centralized gift registry system is also configured to receive information on gift items of the retailer-specific registry, and import the gift items of the retailer-specific registry into the centralized gift registry. In this manner, a gift common to the centralized gift registry and at least one retailer-specific registry is included on the gift registry.

In some embodiments, the creation of the centralized gift registry may provoke the creation of retailer-specific registries on the respective retailers' systems. In some embodiments, the centralized gift registry system includes a centralized gift registry of a gift registrant including a gift available from at least one retailer, and the processor of the centralized gift registry system is configured to send a request for creating a retailer-specific registry of the gift registrant. The retailer-specific registry is associated with the at least one retailer such that the gift is included on both the centralized gift registry and the retailer-specific registry. In some embodiments, the processor first determines if the retailer-specific registry of the gift registrant exists, and sends the request for creating the retailer-specific registry in response to this determination. If the retailer-specific registry exists, the processor sends a request to add the gift to the retailer-specific registry. In some embodiments, the processor is configured to receive a request from the gift registrant for creating the retailer-specific registry.

In some embodiments, when gifts are added to the gift list of the centralized gift registry from a retailer's catalog, one or more retailer-specific registries including these gift items may be created. In other embodiments, when a gift registrant accesses the centralized gift registry to create or modify their gift list, they may select one or more retailers. The centralized gift registry system may then automatically submit a request for the creation of retailer-specific registries at each of the retailers selected by the gift registrant, based in part on information provided to the centralized gift registry by the gift registrant. The information may be associated with one or more gift items. This creation process may involve the use of retailer-specific and/or centralized gift registry system's APIs. The registry creation process may involve generating and transmitting a request for creation of the registry from the centralized gift registry to the respective retailer system's API. Gifts that pertain to a particular retailer's system are passed on to that retailer's system allowing for the creation of one or more retailer-specific registries using gift items from the centralized gift registry.

BRIEF DESCRIPTION OF THE DRAWINGS

The detailed description below of certain illustrative embodiments of the present disclosure refers to the accompanying drawings, of which:

FIG. 9 is a display screen showing how a gift registrant may begin to import retailer-specific registry items into a centralized gift registry, according to an illustrative embodiment;

FIG. 11 is a display screen showing how a gift giver and/or a gift registrant may update or purchase gift items from a gift list of a centralized gift registry, according to an illustrative embodiment;

FIG. 12A is a display screen showing how a gift registrant may add a cash gift item to a gift list of a centralized gift registry, according to an illustrative embodiment;

FIG. 12B is a display screen showing how a gift giver and/or a gift registrant may update or purchase a cash gift item of a gift list of a centralized gift registry, according to an illustrative embodiment;

DETAILED DESCRIPTION OF CERTAIN ILLUSTRATIVE EMBODIMENTS

Various illustrative devices and platforms that may implement embodiments of the present centralized gift registry system are described in more detail below with reference to FIGS. 1A, 1B, 2, and 3. Display screens for illustrative embodiments are described with reference to FIGS. 4, 5, 6, 7, 8, 9, 10A-C, 11, 12A, and 12B. While the display screens of FIGS. 4, 5, 6, 7, 8, 9, 10A-C, 11, 12A, and 12B are illustrated as full or partial-screen displays (e.g., web pages), they may generally be displayed in any suitable size or format. FIGS. 13A-F, 14A, 14B, 15A, 15B, 16A, and 16B contain illustrative process flow diagrams for processes that may be implemented on the centralized gift registry systems of FIGS. 1A, 1B, 2, and 3, to generate displays (e.g., web pages), e.g., the display screens of FIGS. 4, 5, 6, 7, 8, 9, 10A-C, 11, 12A, and 12B.

Figure 1A:
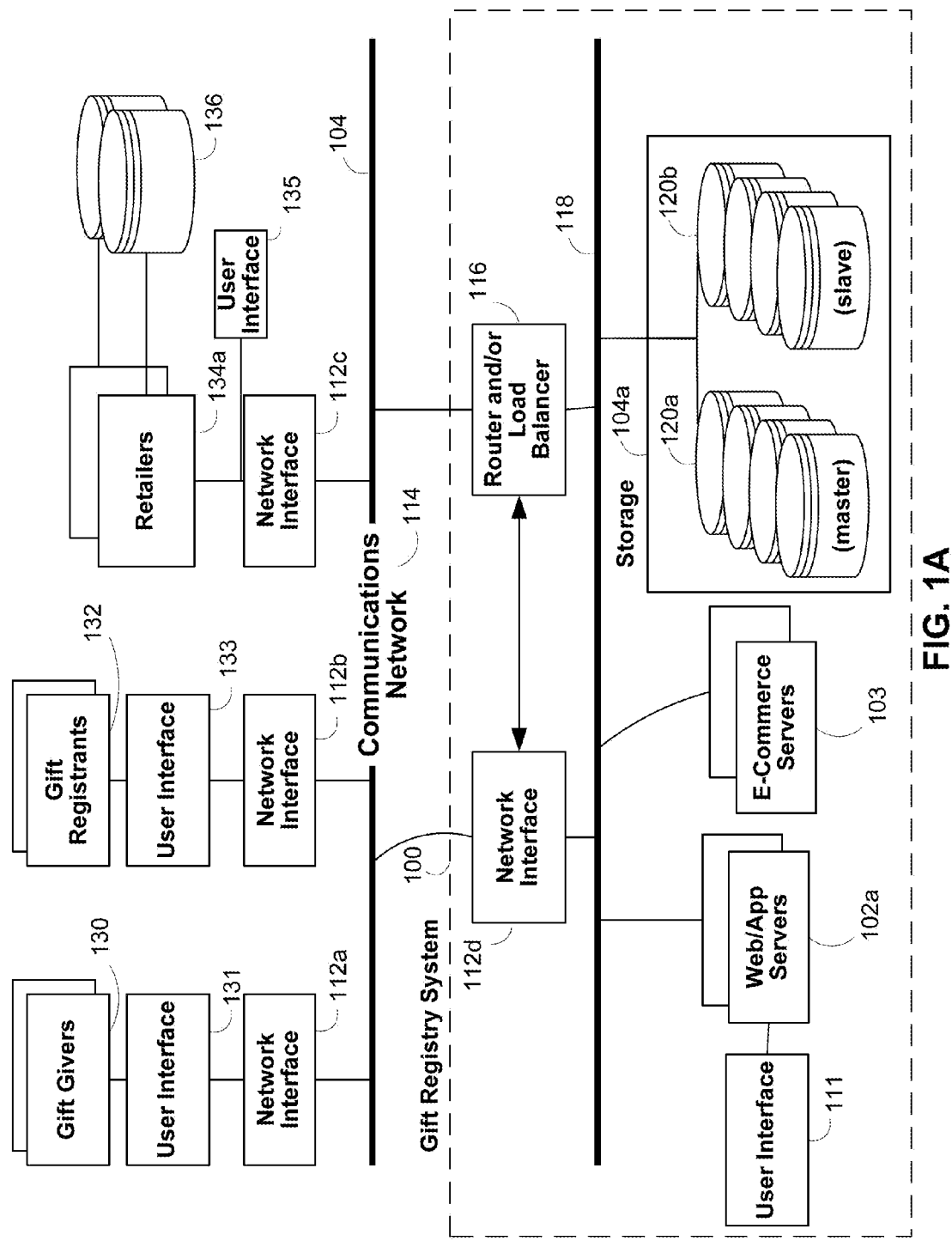
FIG. 1A is a block diagram of a centralized gift registry system including a web/app server, according to an illustrative embodiment.

FIG. 1A shows a block diagram of a centralized gift registry system 100, which includes one or more Internet servers/application servers or web/app servers 102a. Centralized gift registry system 100 may include gift items from several retailer-specific registries. The web/app servers 102a (discussed further in relation to FIG. 1B) are in communication with one or more e-commerce servers 103, a storage 104a, a network interface 112d, and a user interface 111, via system network 118. The communications between these devices may be wired or wireless communications. Storage 104a may include storage devices 120a and/or storage devices 120b. Storage devices 120a and 120b may include any suitable fixed or removable storage devices, e.g., hard drives and optical drives, and include any suitable memory, e.g., random-access memory, read-only memory. This memory may be used to store any suitable information for centralized gift registry system 100. In some embodiments, memory within storage device 136 may store computer-readable program instructions, e.g., an API, which, when executed by a processor within a computing device (not shown) at retailer system 134a, may perform a particular process. In some embodiments, memory within storage device 136 may store one or more data structures (described in detail below in reference to FIG. 3) associated with items available on gift lists for gift registrants 132, one or more gift lists common to one or more retailer systems 134a (e.g., on their retailer-specific registries) and centralized gift registry system 100, or any other suitable information.

Network interface 112d may include a cable modem, an integrated services digital network (ISDN) modem, a digital subscriber line (DSL) modem, a telephone modem, a wireless modem, a satellite receiver, a router, a wireless or wired modem, a cellular or satellite phone, or any other suitable equipment that allows for communication between the web/app servers 102 and a communications network 114. System network 118 and communications network 114 may be any suitable wired or wireless network, including a broadcast, cable, or satellite television network and/or the Internet. User interface 111 may include a PC, a laptop, a tablet, a WEBTV box, a personal computer television (PC/TV), a PC media server, a PC media center, a PDA, a mobile telephone, or any other user computer equipment, including storage devices, user input devices, and display devices. (WEBTV is a trademark owned by Microsoft Corp.) Centralized gift registry system 100 may include a router (e.g., a gateway router manufactured by Cisco Corp.) and/or a load balancer. The router may serve as a gateway between centralized gift registry system 100 and communications network 114, while the load balancer may function to balance the storage load among the storage devices 120a and 120b in within storage 104a.

Centralized gift registry system 100 may communicate with one or more gift givers 130, one or more gift registrants 132, and one or more retailer systems 134a over communications network 114. The retailer systems 134a host one or more retailer-specific registries. Each gift giver 130 and gift registrant 132 may have their own user equipment. The user equipment may include a user interface (131, 133, 135) and/or a network interface (112a, 112b, 112c). Retailer 134 may include a web/app server, or other suitable computer equipment capable of communicating with web/app server 102a of centralized gift registry system 100. Each of the network interfaces 112a-c may include a cable modem, an integrated services digital network (ISDN) modem, a digital subscriber line (DSL) modem, a telephone modem, a wireless modem, a satellite receiver, a router, a wireless or wired modem, a cellular or satellite phone, or any other suitable equipment that allows for communication with communications network 114. Each user interface 131, 133, 135 may include a keyboard, a mouse, a PC, a laptop, a tablet, a WEBTV box, a personal computer television (PC/TV), a PC media server, a PC media center, a PDA, a mobile telephone, or any other user computer equipment, including storage devices, user input devices, and display devices. For instance, retailer system 134a may have associated storage device 136. Storage device 136 may include memory. This memory may be used to store any suitable information for the retailer. In some embodiments, memory within storage device 136 may store computer-readable program instructions, e.g., an API, which, when executed by a processor within a computing device (not shown) at retailer system 134a, may perform a particular process. In some embodiments, memory within storage device 136 may store one or more data structures (described in detail below in reference to FIG. 3) associated with items available for purchase at the retailer, items on gift lists for gift registrants 132, one or more gift lists common to a retailer's retailer-specific registry system and centralized gift registry system 100, or may store any other suitable information.

Web/app server 102a of centralized gift registry system 100 may act as a host for a centralized gift registry, such as a wedding registry. The gifts on the gift list of the centralized gift registry may be stored in storage 104a in the form of any suitable data structure and using any suitable database programming environment, e.g., a MySQL database associated with a Linux or Apache server. In such an implementation, one set of storage devices 120a may act as the "master" MySQL database, while the other set of storage devices 120b may act as the "slave" MySQL database. Web/app server 102a may receive messages from a gift registrant 132 over communications network 114. These messages may include requests for creating the centralized gift registry, requests for searching for an associated retailer-specific registry, requests for adding items to the centralized gift registry, requests for removing items from the centralized gift registry, requests for adding a cash gift to the centralized gift registry, requests to pass messages to one or more gift givers, requests for removing a cash gift from the centralized gift registry, requests for modifying display screens (e.g., web pages) of the centralized gift registry, requests to update the gift list of the centralized gift registry, or any other suitable requests. Each of these requests may include a request for authentication, whereby the identity of the gift registrant 132 is authenticated with the web/app server 102*a*. These requests may be processed by a processor of web/app server 102*a* using a centralized gift registry API, as will be discussed further in reference to FIGS. 2 and 3. In response to the received requests, web/app server 102*a* may generate and send display screens, e.g., in http or XML format, or other information associated with the centralized gift registry to a gift registrant 132.

Web/app server 102*a* may also receive messages from a gift giver 130 over communications network 114. These messages may include requests for searching for a gift registrant's centralized registry or a retailer-specific registry that is associated with the gift registrant's centralized gift registry, requests for purchasing gifts from the centralized gift registry, requests to pass a message to a gift registrant, requests for receiving display screens including gifts from a gift registrant's gift list, requests for modifying display screens of the centralized gift registry, or any other suitable requests. Each of these requests may include a request for authentication, whereby the identity of the gift giver 130 is authenticated with the web/app server 102*a*. These requests may also be processed by a processor of web/app server 102*a* using the centralized gift registry system's API, as will be discussed further in reference to FIGS. 2 and 3. In response to the received requests, web/app server 102*a* may send display screens, e.g., in http format, or other information to the gift giver 130 or gift registrant 132.

Web/app server 102*a* may also receive messages from a retailer system 134*a*, e.g., from the retailer's retailer-specific registry system over communications network 114. These messages may include requests for searching for a gift registrant's centralized gift registry, requests for purchasing gifts or other items from the centralized gift registry, requests to pass a message to a gift registrant or a gift giver, requests for receiving display screens including gifts from a gift registrant's gift list, requests for modifying display screens of the centralized gift registry, or any other suitable messages. Each of these requests may include a request for authentication, whereby the identity of the retailer 130 is authenticated with the web/app server 102*a*. These requests may also be processed by a processor of web/app server 102*a* using the centralized gift registry API, as will be discussed further in reference to FIGS. 2 and 3. In response to the received requests, web/app server 102*a* may send display screens, e.g., in http format, or other information to the retailer system 134*a*.

In some embodiments, the e-commerce server(s) 103 (FIG. 1A) is used to process purchase requests received by the web/app server 102*a*. In some embodiments, e-commerce servers associated with retailer(s) 134*a* (FIG. 1A) are configured to process purchase requests received by either the centralized gift registry system 100 (FIG. 1A) or an associated retailer-specific registry system. Once the purchase request has been fulfilled by an e-commerce server, an indication that the purchase request has been fulfilled may be transmitted between the centralized gift registry system 100 (FIG. 1A) and an associated retailer-specific registry system.

Figure 1B:
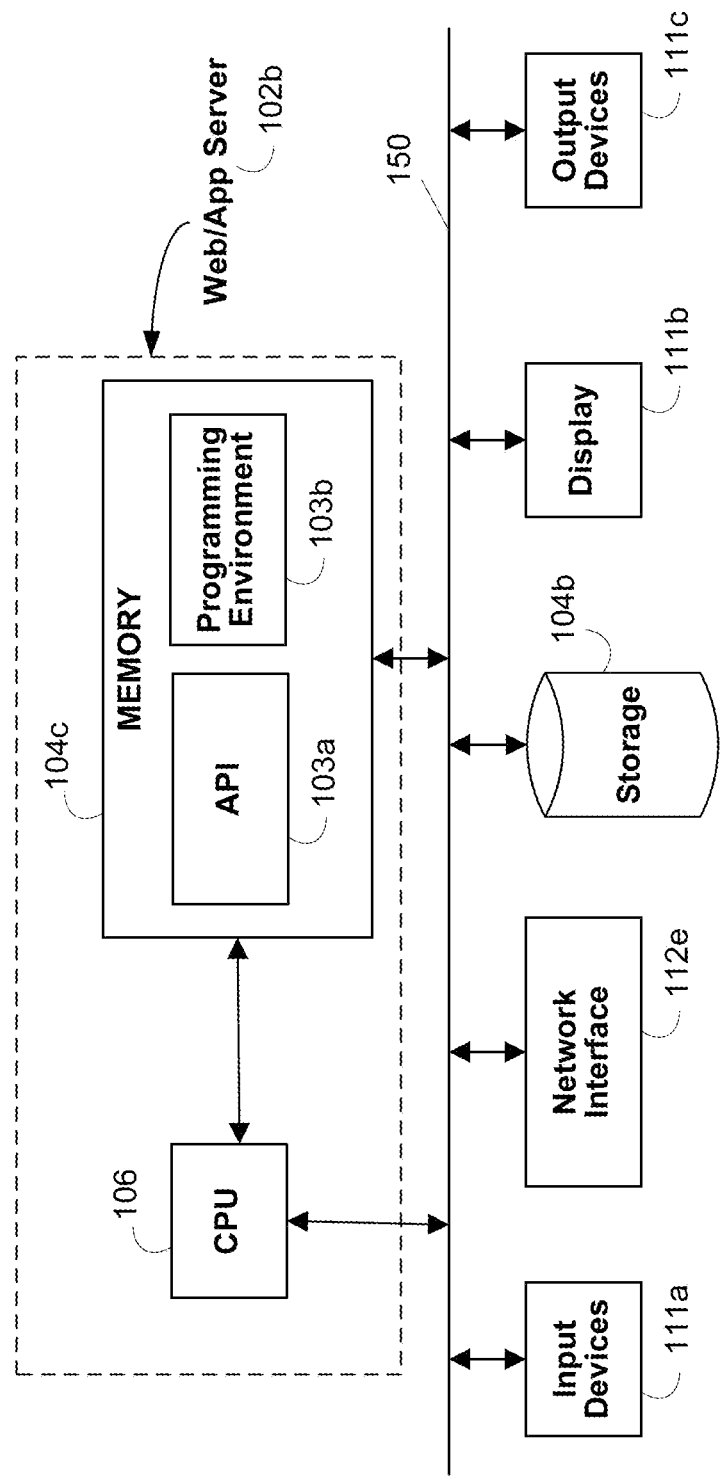
FIG. 1B is a block diagram of a registry web/app server, according to an illustrative embodiment.

FIG. 1B is a detailed block diagram of a web/app server 102*b*, which may be part of centralized gift registry system such as web/app server 102*a* (FIG. 1A), or a retailer web/app server (not shown in FIG. 1A). Web/app server 102*b* includes a central processing unit (CPU) 106, and internal memory 104*c*. Memory 104*c* may include an API 103*a* and/or any other suitable programming environment 103*b*. Web/app server 102*b* may be in communication via network 150 with one or more input devices 111*a*, a network interface 112*e*, storage 104*b*, a display 111*b*, and one or more output devices 111*c*. The network interface 112*e* may include similar components to the network interfaces 112*a-d* described above in relation to FIG. 1A. Network 150 may be any suitable wired or wireless network. Storage 104*b* may also be similar to the storage 104*a* described above in relation to FIG. 1A. Display 111*b* may include any suitable display device, e.g., a LCD or plasma display. Input devices 111*a* may include a keyboard, a mouse, a remote control, or any other suitable device, while output devices 111*c* may include external memory or other peripheral devices that may be operable when connected to web/app server 102*b* via network 150.

Figure 2:
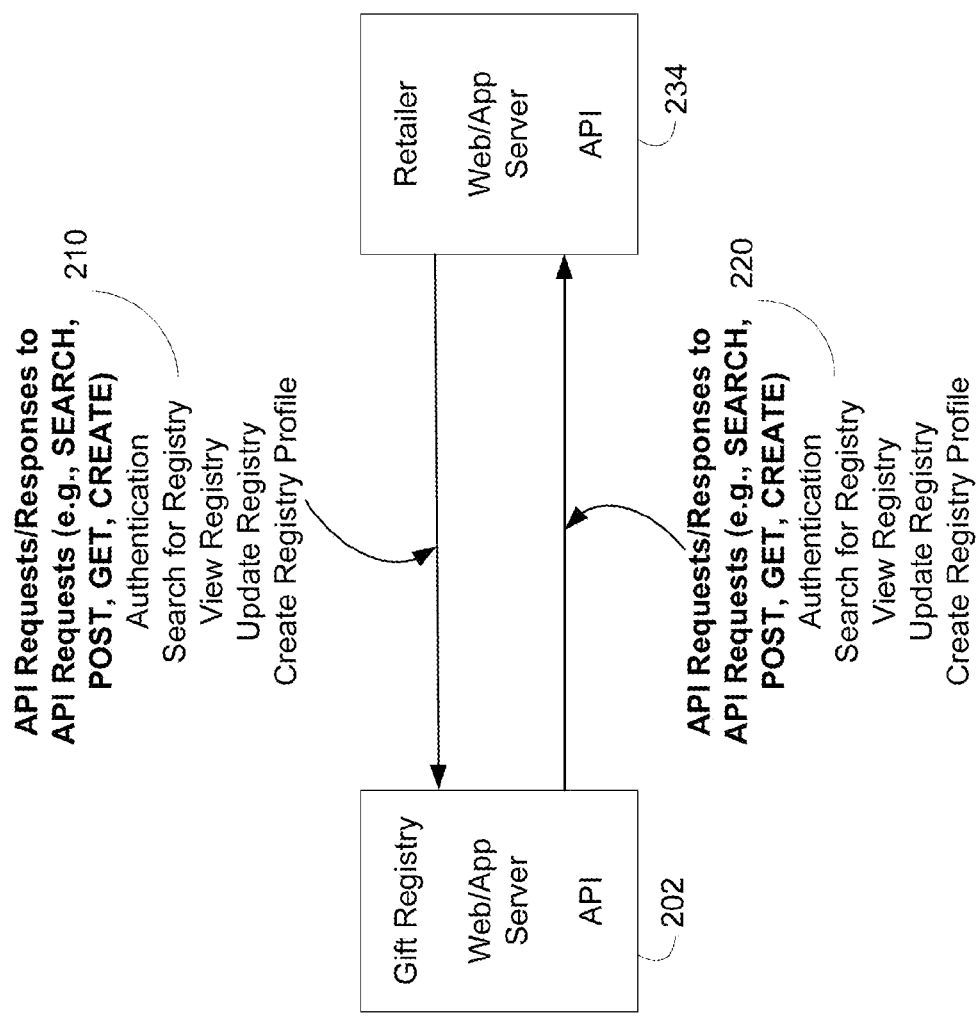
FIG. 2 is an information flow diagram for requests sent over a communications network between a centralized gift registry and a retailer, according to an illustrative embodiment.

FIG. 2 is an information flow diagram for requests sent between one or more web/app servers of a centralized gift registry system (e.g., centralized gift registry system 100 of FIG. 1A) and one or more web/app servers of a retailer (e.g., retailer 134 of FIG. 1A) over a communications network, such as communications network 114 (FIG. 1A). Those skilled in the art will recognize that equipment other than web/app servers may be used to initiate or respond to these requests. For example, a backend server at a retailer's system may respond to, or initiate, requests to the centralized gift registry system.

FIG. 2 shows a centralized gift registry system 202 including a web/app server and centralized gift registry system's API, and a retailer 234 which may also include a web/app server and a retailer-specific registry system's API. The API may be programming language-dependent or language-independent. For example, requests via an API function call to a web/app server may be made in a particular language or format (e.g., http, XML), while responses to requests may be made in the same or a different language or format, e.g., Representational State Transfer—REST (with Extensible Mark up Language—XML) or Javascript Object Notation—JSON. In some embodiments, the retailer web/app server may send requests 210 via the centralized gift registry system's API. Requests 210 may be made in any suitable format, e.g., http, and may include requests for authentication, requests for searching the centralized gift registry, requests for viewing or updating a centralized gift registry, and requests for creating a gift registrant profile with the centralized gift registry system. In addition, the centralized gift registry system's web/app server may send requests 220 via the retailer-specific registry system's API. Requests 210 may be sent in any suitable format, e.g., http, and may include requests for authentication, requests for searching the retailer-specific gift registry, requests for viewing or updating the retailer-specific gift registry, and requests for creating a gift registrant profile on the retailer-specific registry system.

In some embodiments, the retailer-specific and/or centralized gift registry system's APIs are a set of "allowable" http request messages and a suitably defined set of responses. The responses may be sent in any suitable language, e.g., REST with XML or JSON. Programming references for these languages are readily available, and those skilled in the art will appreciate their availability. In some embodiments, the centralized gift registry system API allows for a number of requests from a retailer. For instance, a retailer web/app server may be able to search for, view, create, and edit registries via API function calls to the centralized gift registry system.

In some embodiments, each request made via the centralized gift registry system's API must be authenticated. An API request may also be referred to as an API function call. This authentication may be performed in any suitable manner, e.g., using a client-server public-private key system, e.g., by computing a digital signature using the HMAC-SHA1 signature method. For instance, requests made by either the centralized gift registry system or the retailer-specific registry system may be authenticated by computing a digital signature using the HMAC-SHA1 signature method. Those skilled in the art will appreciate that the retailer-specific registry system or centralized gift registry system may digitally sign an API request using a secret private key that only these systems and the respective API web/app server know. To carry out such authentication, each gift registry system's API request may include fields such as api_key (a public key provided to the retailer-specific registry system or centralized gift registry system that allows the API to know their identity), api_sig (e.g., a HMAC-SHA1 signature of the request that is generated by the retailer-specific registry system or centralized gift registry system client using their private key), nonce (a unique random ID generated by the retailer-specific registry system or centralized gift registry system to identify their request), date (the date and/or time when the request is made). In some embodiments, access to the centralized gift registry system API may be restricted such that a retailer's system will only receive a public key and a private key string if the retailer has permission to make requests the centralized gift registry system API. As with most public-private key systems, the private key string is used only to digitally sign the API request and is not included in the API request. On the other hand, the public key is included in each API request so that the centralized gift registry system can determine, based at least in part on the digital signature of the API request, that the retailer-specific registry system's private key generated the API request.

In some embodiments, the retailer web/app server may host a retailer gift registry, while the gift registry web/app server will host a centralized gift registry. The centralized gift registry may include gift items available from multiple retailers' catalogs and/or retailer-specific registries. These gift items may be added into the gift list stored on the centralized gift registry system (e.g., of centralized gift registry system 100 of FIG. 1A). The retailer-specific registry system and/or the centralized gift registry system may store information in addition to the registries themselves. This information may include information about a gift registrant (e.g., an upcoming event, contact information for the gift registrant, shipping and mailing address information for the gift registrant) and/or information regarding one or more gift items associated with the retailer's offerings. In some embodiments, the retailer web/app server does not host a retailer-specific gift registry, but may provide this information to the centralized gift registry in response to requests made via the retailer-specific registry system's API. In some embodiments, the retailer web/app server does not host a retailer-specific gift registry, and does not include an API. In this case, the retailer may provide information to the centralized gift registry in response to "scraping" requests (e.g., in http) it receives from the centralized gift registry. The centralized gift registry web/app server may also provide information to a retailer in response to requests made via the retailer-specific gift registry system's API.

There are several requests that can be made via an API to a web/app server. A "SEARCH" API request may be used to perform registry searches and query a centralized gift registry or retailer-specific registry for registries that match the profile and/or event of a particular gift registrant. The details for such a registry may be retrieved with a request via the API. A SEARCH API request may include several fields and/or variables in any suitable format. For example, a SEARCH API request may include inter alia the fields (variables) fn (first name of gift registrant), ln (last name of gift registrant), ain (authentication information, e.g., a password associated with a respective API), em (month of gift registrant's event), ey (year of gift registrant's event), and limit (the quantity of results to return, e.g., a maximum of 100). A "GET" API request may be used to obtain a complete collection of all gifts of a gift list of the retailer-specific or centralized gift registry. Optionally, this collection may include so-called "buy" uniform resource locators (URLs) for each gift item that can be used to determine the desired quantity and number purchased for a particular gift item. Such URLs may be transmitted to the gift registry system's API web/server from an e-commerce server, e.g., server 103 (FIG. 1A). A GET API request may include inter alia the fields (variables) fn (first name of gift registrant), ln (last name of gift registrant), gl (list of gift items), gn (number of gift items), rsrh (host of the retailer-specific registry), ain (authentication information, e.g., a password associated with a respective API), em (month of gift registrant's event), ey (year of gift registrant's event), and limit (the quantity of results to return, e.g., a maximum of 100). A "POST" API request may be used to add an item to a centralized or retailer-specific gift registry or to update an item on a centralized or retailer-specific gift registry. The centralized or retailer-specific gift registry system's API may be used to add/update centralized or retailer-specific gift registry items and respond to the requester with a "successfully added" or "pending" http message. A POST API request may include inter alia the fields (variables) fn (first name of gift registrant), ln (last name of gift registrant), ugi (gift item update, e.g., add, delete, increase quantity to x, decrease quantity to y), gn (number of gift items), rsrh (host of the retailer-specific registry), ain (authentication information, e.g., a password associated with a respective API), em (month of gift registrant's event), and ey (year of gift registrant's event).

Each of the above-described requests may require authentication by the web/app server hosting the API, as described above. A "CREATE" API request may be used to create a retailer-specific gift registry. This API request is generally used if or when the centralized gift registry system wants to create one or more retailer-specific registries on respective retailer websites or stores, or vice-versa. A POST API request may include inter alia the fields (variables) fn (first name of gift registrant), ln (last name of gift registrant), gi (gift item information, e.g., SKU number, bar code, unique identifier), gc (gift item category, e.g., kitchen, bedding, bath), gn (number of gift items), rsrh (host of the retailer-specific registry), ain (authentication information, e.g., a password associated with a respective API), em (month of gift registrant's event), and ey (year of gift registrant's event). Those skilled in the art will come to realize that each of the above-described requests may require authentication by the web/app server hosting the API, as described above. Furthermore, each of the above-described requests may include any suitable fields and/or variables. As mentioned above, the retailer and/or centralized gift registry systems may not include an API. In these embodiments, requests may be made using a non-API environment, e.g., "scraping" requests may be made to the centralized gift registry or retailer web/app server, e.g., in http format.

As described above, a retailer-specific registry and/or a centralized gift registry includes information about items on a gift list. This information may be stored in a data structure within a memory, such as memory in storage 104a (FIG. 1A) or 104b (FIG. 1B).

Figure 3:
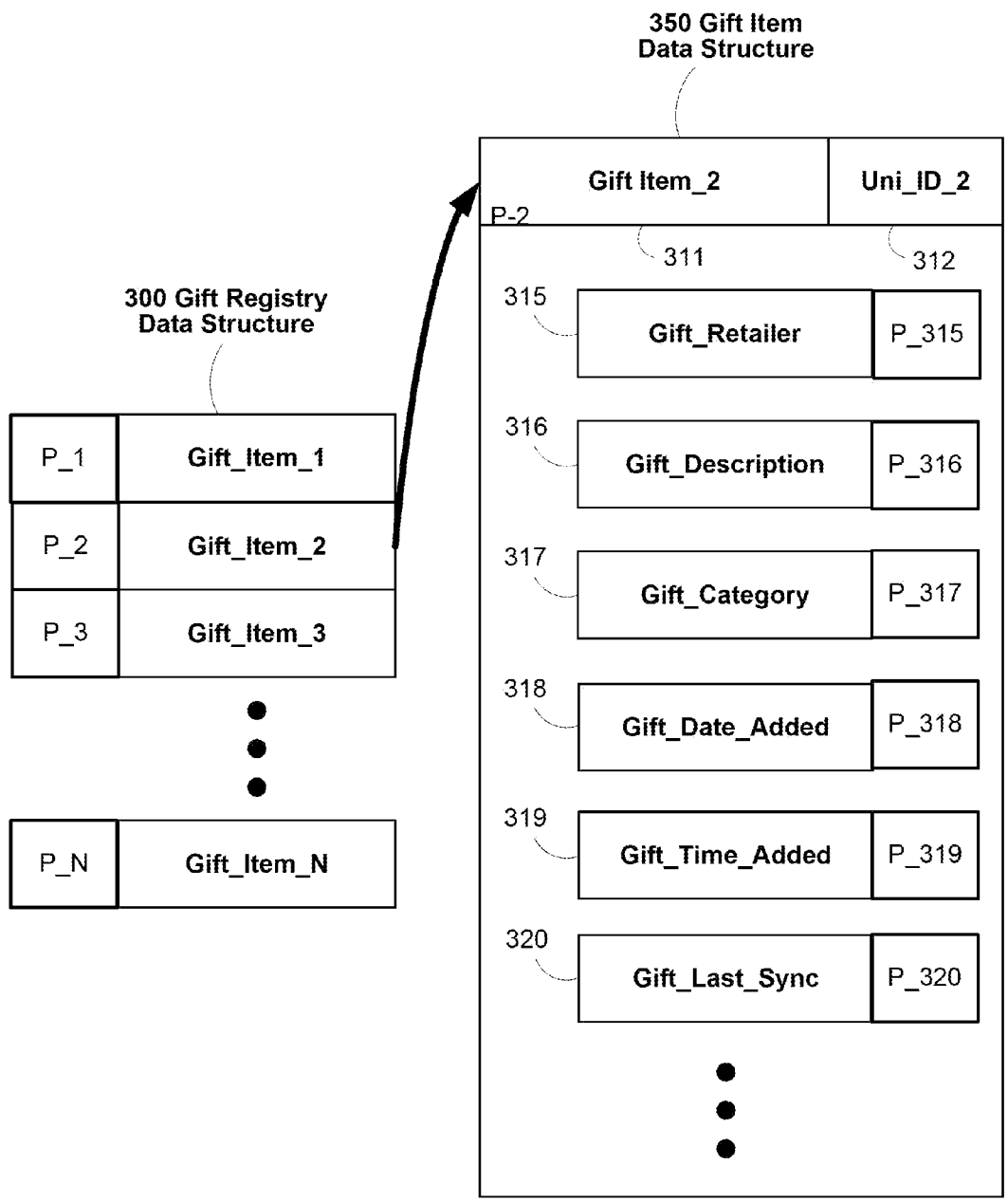
FIG. 3 shows data structures that may be associated with a centralized gift registry, according to an illustrative embodiment.

FIG. 3 illustrates data structures that may be associated with a retailer-specific and/or a centralized gift registry system, without limitation. Gift registry data structure 300 may store information, i.e., metadata (e.g., Gift_Item_1, Gift_Item_2, Gift_Item_3, . . . , Gift_Item_N) and/or pointers (e.g., P_1, P_2, P_3, . . . , P_N), that is associated with one or more gift items of the centralized or retailer-specific gift registry. Data structure 300 may be stored in a storage device such as storage 104a (FIG. 1A) or 104b (FIG. 1B). The metadata and pointers in data structure 300 may be associated with gift items. For instance, each entry in the data structure 300 may be associated with an individual gift item, or may contain a pointer from a particular gift item to a second data structure comprising more information on that particular gift item, such as gift item data structure 350, or to other metadata stored within the memory.

In FIG. 3, pointer P_2 associated with Gift_Item_2 is associated with gift item data structure 350. Gift item data structure 350 may include alphanumeric identifiers such as Gift_Item_2 identifier 311 and a unique identifier Uni_ID_2 312. These identifiers may alone or in combination with one another uniquely identify a gift item on the gift list of a gift registrant. In addition, gift item data structure 350 may also include other metadata and pointers associated with gift item Gift_Item_2. This metadata may include a description of a retailer which sells the gift item Gift_Retailer 315, a description of the gift item Gift_Description 316, a description of a category for the gift item Gift_Category 317, a date on which the gift item was added to the centralized or retailer-specific gift registry Gift_Date_Added 318, a time at which the gift item was added to the centralized or retailer-specific gift registry Gift_Time_Added 319, and a description of the last time there was a change in any information stored in structure 350 Gift_Last_Sync 320. Suitable Gift_Description metadata may include a text and/or image that is associated with a particular gift. Suitable Gift_Category metadata may include any suitable gift category, e.g., bedding, kitchen, glassware, flatware, and silverware. Each of these metadata may have associated pointers P_316, P_317, P_318, P_319, and P_320. These pointers may be associated with yet other data structures which may contain additional metadata and/or pointers. In some embodiments, a gift list may be associated with a daisy-chained set of data structures.

In some embodiments, data structures 300 and 350 may be used in a centralized or retailer-specific gift registry system search and/or filter task. The alphanumeric identifiers, metadata and/or pointers associated with a set of gift items, e.g., Gift_Item_1, . . . , Gift_Item_N, may be used by a suitable search or filtering algorithm to find information required by the centralized or retailer-specific gift registry system. For instance, the metadata Gift_Category in the gift item data structures stored in the memory of the centralized or retailer-specific gift registry system may be searched to find gift items of only a particular category. For instance, the centralized or retailer-specific gift registry system may need to find and display gift items in the "glassware" category, and may find these items by searching through the centralized or retailer-specific gift registry data structures for items whose "Gift_Category" metadata includes glassware.

The metadata and pointers described above are merely illustrative. Those skilled in the art will come to realize that any suitable information associated with a gift on a gift list may be stored in such data structures, and any suitable search and/or filter tasks may be performed using these data structures.

Next, we turn to illustrative display screens generated by a centralized gift registry system, such as centralized gift registry system 100 (FIG. 1A). In some embodiments, these display screens may be web pages generated by the web/app server 104a (FIG. 1A) or 104b (FIG. 1B) of the centralized gift registry system 100 (FIG. 1A) and may be transmitted to a gift registrant 132 (FIG. 1A) or a gift giver 130 (FIG. 1A) over the communications network 114 (FIG. 1A), allowing these users to interact with the centralized gift registry system 100 (FIG. 1A).

Figure 4:
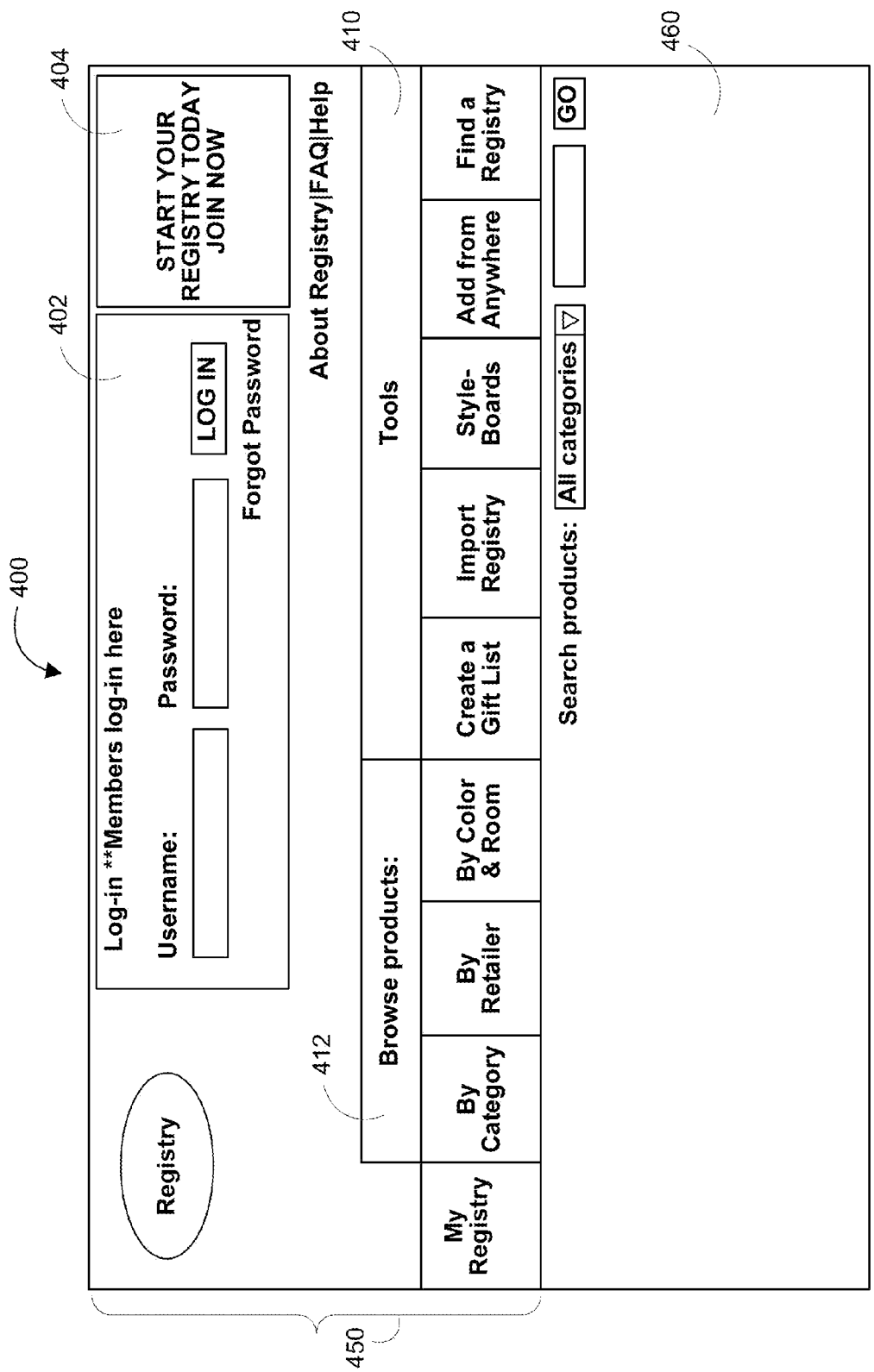
FIG. 4 is an initial display screen for a gift registrant or gift giver before they have authenticated their identity with the centralized gift registry system, according to an illustrative embodiment.

FIG. 4 is an illustrative initial display screen 400 that may be generated and transmitted, e.g., over communications network 114 (FIG. 1A), to a gift registrant or gift giver. Such a display screen may be generated by centralized gift registry system 100 (FIG. 1A), and may be generated and transmitted, e.g., over communications network 114 (FIG. 1A), to a gift registrant or gift giver when they first attempt to access the centralized gift registry system, i.e., before they have authenticated their identity with the centralized gift registry system. Display screen 400 includes top section 450 and bottom section 460. Each of these sections may include images and/or text and/or video and/or a plurality of hyperlinks to other display screens that may be generated and transmitted, e.g., over communications network 114 (FIG. 1A), to a gift registrant or a gift giver. Top section 450 includes a login section 402, an advertisement section 404, a browsing toolbar 412, and a registry toolbar 410. Login section 402 includes areas in which a gift registrant or gift giver may enter a username and password for accessing the centralized gift registry system. Advertisement section 404 may include any suitable advertisement, e.g., an advertisement for the centralized gift registry system itself, or asking gift registrants to create a registry on the centralized gift registry system. Browsing toolbar 412 includes hyperlinks for accessing a centralized gift registry, and for browsing the centralized gift registry by product, by category, by color, by room, or by retailer. Those skilled in the art will realize that other browsing categories may be used in toolbar 412.

With continued reference to FIG. 4, registry toolbar 410 includes hyperlinks for creating a centralized gift registry or importing a retailer-specific registry into the centralized gift registry. Optionally, registry toolbar 410 includes hyperlinks for finding a centralized gift registry, "styleboards", or adding gift items to a registry from anywhere (i.e., "Add from Anywhere" feature). Styleboards refer to a plurality of gift items associated with a particular gift theme, e.g., gift items pertaining to a gift registrant's bedroom, living room, or kitchen on the gift registrant's gift registry. In some embodiments, a styleboard is a web page that includes a display of this plurality of gift items. The display may include a suitable background, e.g., the base color of the web page, as well as a suitable arrangement of the gift items. Styleboards may be useful as they allow gift givers to view and/or purchase gifts that pertain to a gift registrant's gift theme. Thus, a gift giver selecting gift items may access a particular styleboard of a gift registrant to select these gift items for viewing or purchasing. Each of top section 450 or bottom section 460 may include other menus (e.g., drop-down menus), toolbars, or areas that include options and/or hyperlinks for navigating through display screens that may be generated by the centralized gift registry system.

In some embodiments, when a gift registrant selects the styleboards hyperlink, the gift registrant will be able to access a web page generated by the centralized gift registry system which explains the concept of styleboard and directions for creating and editing styleboards. In some embodiments, a gift registrant may create or modify a background for a styleboard. In some embodiments, a gift giver or gift registrant may view the gift list of the centralized gift registry as a styleboard. For example, a gift registrant may view their gift list add more gift items to the styleboard, e.g., from a retailer catalog or retailer-specific registry.

Figure 5:
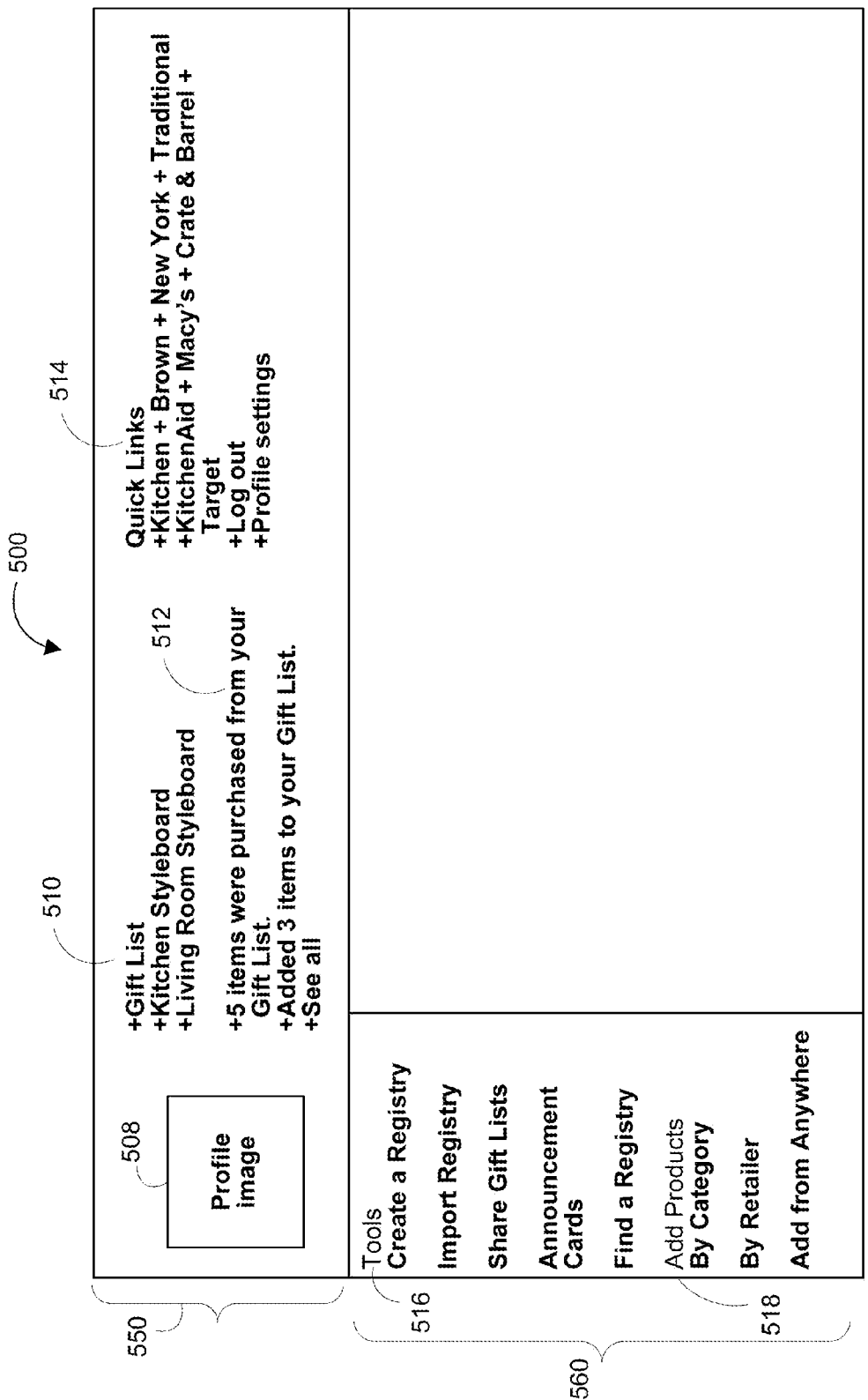
FIG. 5 is a display screen for a gift registrant once they have authenticated their identity with the centralized gift registry system, according to an illustrative embodiment.

FIG. 5 is an illustrative initial display screen 500 that may be generated and transmitted, e.g., over communications network 114 (FIG. 1A), to a gift registrant. Such a display screen may be generated by centralized gift registry system 100 (FIG. 1A), and may be generated and transmitted to a gift registrant once they have authenticated their identity with the centralized gift registry system. Such authentication may be performed, e.g., by entering a password and username in area 402 of display screen 400 (FIG. 4). Display screen 500 includes top section 550 and bottom section 560. Each of these sections may include images and/or video and/or text and/or a plurality of hyperlinks to other display screens that may be generated and transmitted, e.g., over communications network 114 (FIG. 1A), to the gift registrant. Top section 550 may include a profile image 508 supplied by the gift registrant. Top section 550 may additionally, or optionally, include selected hyperlinks to other display screens 510, quick links to other display screens 512, and links 514 to recent updates to the gift registrant's gift list. Bottom section 560 may include a toolbar 516 for creating or importing gift items into the centralized gift registry, sharing gift lists, creating announcement cards (e.g., "Save the Date" cards), and finding a registry. Bottom section 560 may also include an "Add Products" toolbar 518. The add products toolbar 518 may be used to add products by category, by retailer, or using the "add from anywhere" feature of some embodiments of the centralized gift registry system. Those skilled in the art will realize that there are many variants of the display screen shown in FIG. 5, including, e.g., additional toolbars for navigating through the display screens of the centralized gift registry.

Figure 6:
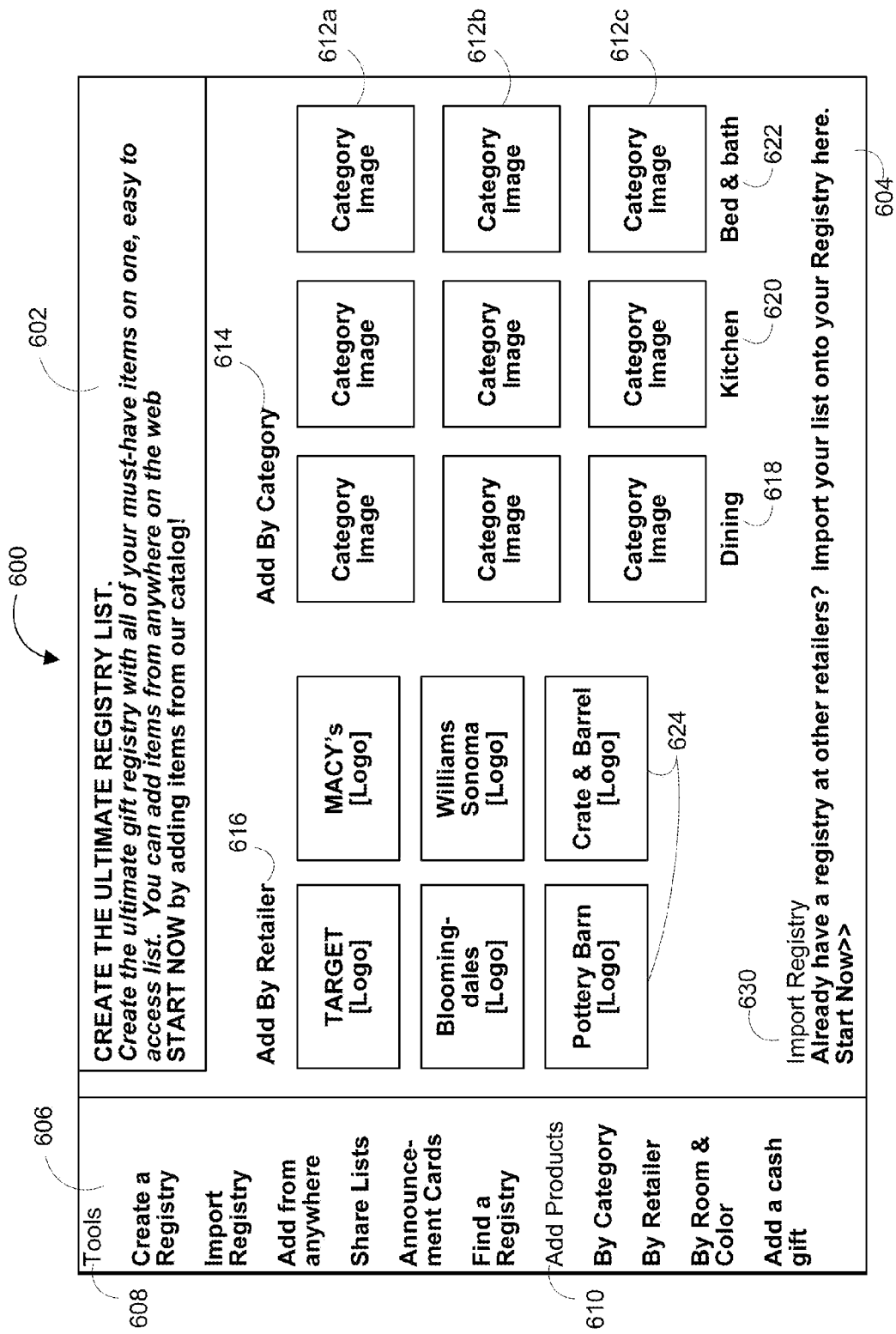
FIG. 6 is a display screen showing how a gift registrant may add items from a retailer's catalog to a gift list of the centralized gift registry system, according to an illustrative embodiment.
Figure 7:
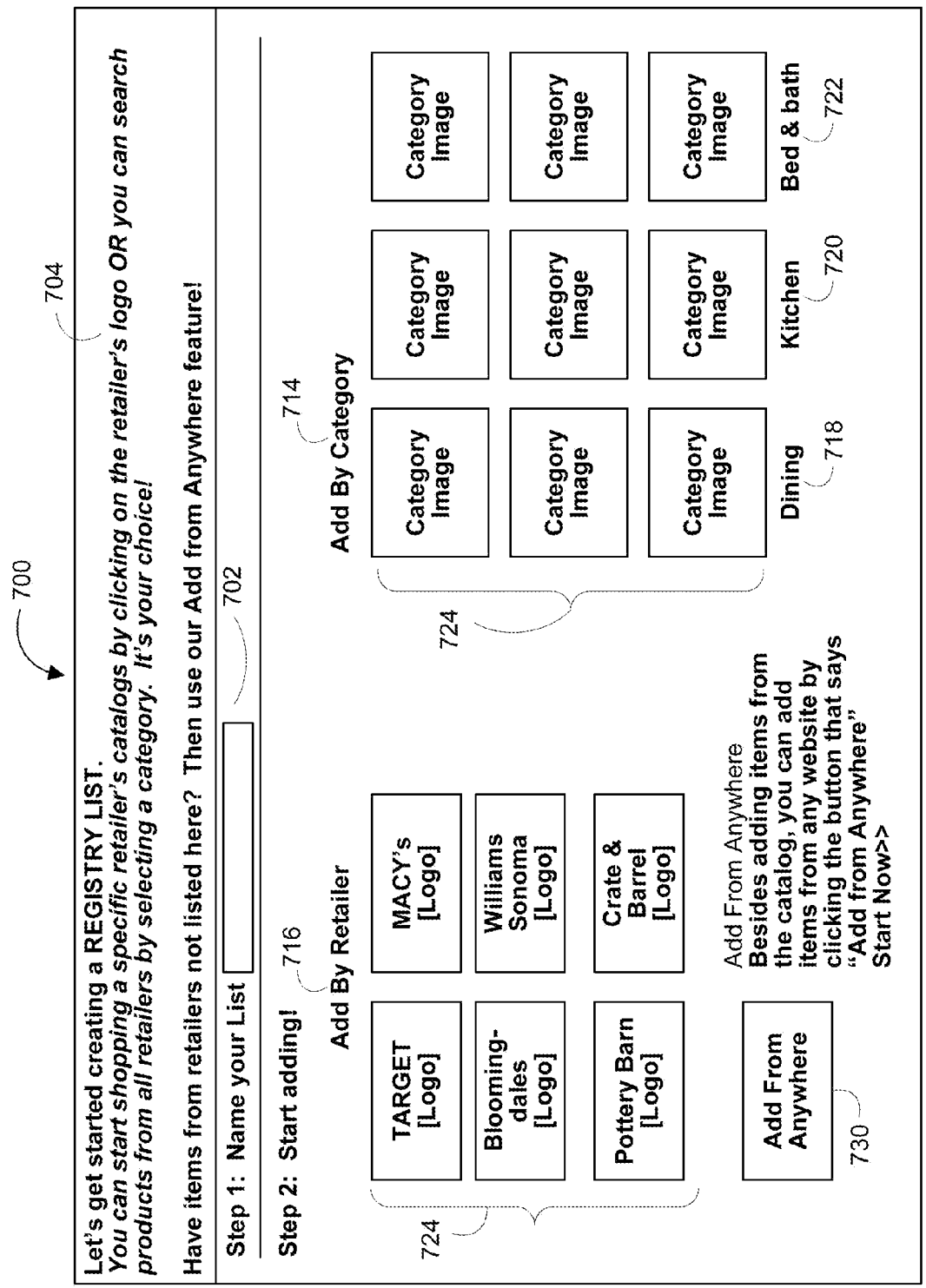
FIG. 7 is a display screen showing how a gift registrant may add items by retailer to a gift list of the centralized gift registry system, according to an illustrative embodiment.
Figure 8:
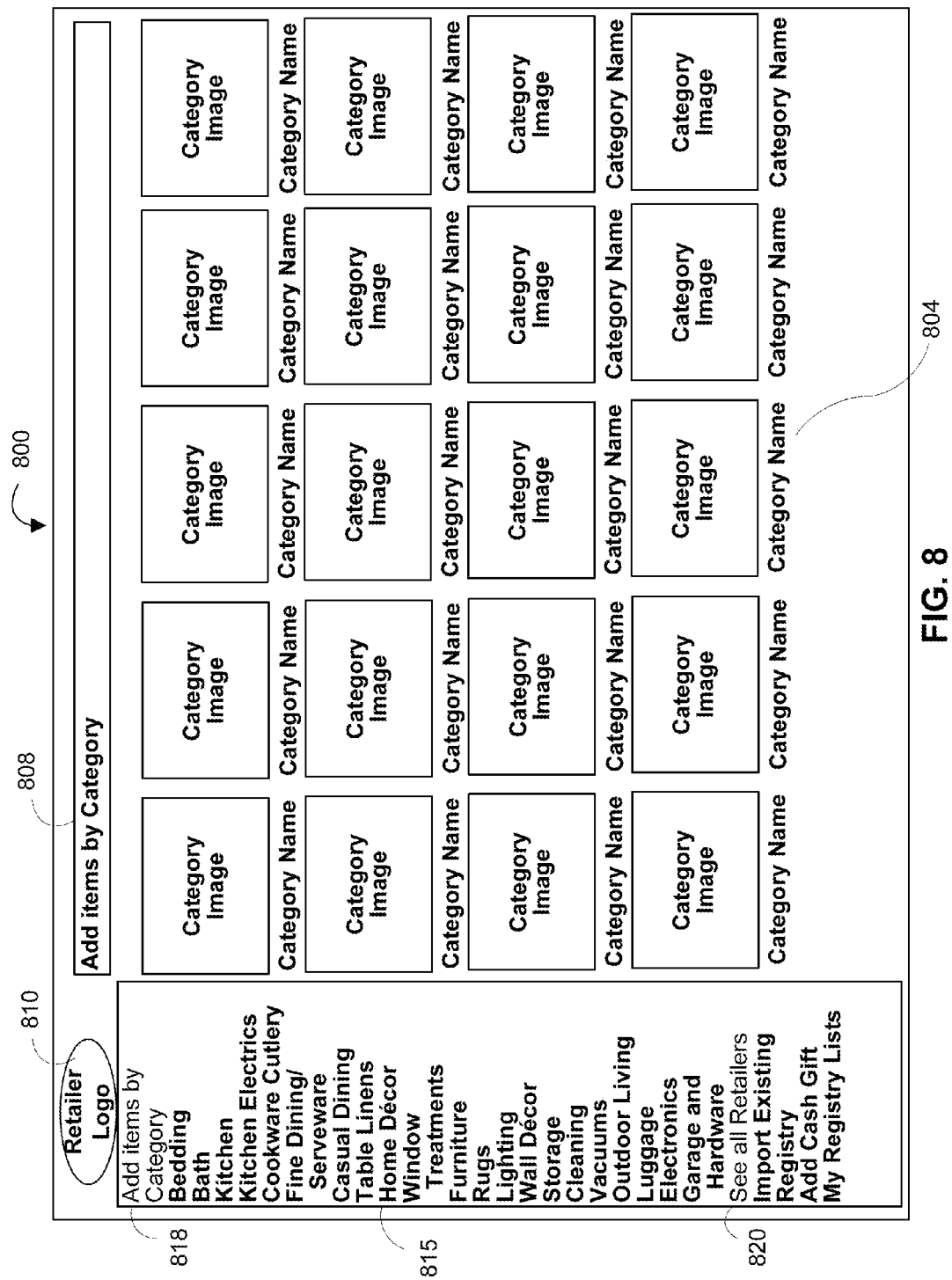
FIG. 8 is a display screen showing how a gift registrant may add items by category from a retailer's catalog to a gift list of the centralized gift registry system, according to an illustrative embodiment.

FIGS. 6, 7, and 8 show illustrative display screens 700, 800, and 900, respectively. FIG. 6 shows a display screen 600 that enables a gift registrant to add items from a retailer's catalog to their gift list on the centralized gift registry system. FIG. 7 shows a display screen 700 that allows a gift registrant to add items to their gift list on the centralized gift registry system by first selecting a particular retailer. FIG. 8 shows a display screen 800 that allows a gift registrant to add gift items to their gift list on the centralized gift registry system by first selecting a category from a retailer's catalog. Each of the display screens 600, 700, and 800 may require a gift registrant to authenticate their identity with the centralized gift registry system prior to allowing the gift registrant to access the features illustrated on the respective display screens. As with display screens 400 (FIG. 4) and 500 (FIG. 5), each of display screens 600, 700, and 800 may include images and/or text and/or video and/or a plurality of hyperlinks to other display screens that may be generated and transmitted, e.g., over communications network 114 (FIG. 1A), to the gift registrant and/or gift giver. Those skilled in the art will realize that there are many variants of the display screens shown in FIGS. 6, 7, and 8, including, e.g., additional toolbars or links for navigating to other display screens of the centralized gift registry.

With reference to FIG. 6, display screen 600 includes a top section 602, bottom section 604 and side section 606. Top section 602 may display an advertisement relating to the centralized gift registry as shown. Side section 606 includes a toolbar including links 608 and links 610. Links 608 may include links to other display screens, including, but not limited to, a link for creating a centralized gift registry, a link for importing a retailer-specific registry, an "add from anywhere" link for adding items from a retailer's catalog or retailer-specific registry to the centralized gift registry, a link that allows a user to share their gift list of the centralized gift registry with one or more gift givers, a link that allows a user to create announcement cards for an event, and a link to find a centralized gift registry or a retailer-specific gift registry. Links 610 include links related to adding gift items (retailer products) to the centralized gift registry. These products may be added by category, by retailer, by room, or by color. Links 610 also include a link to allow a gift registrant to add a cash gift item, e.g., a request to one or more gift givers for a certain amount of currency that could be used towards a couch. Cash gifts will be described further in relation to the display screens of FIGS. 12A and 12B. Each of these selections may involve the use of an API function call to a respective retailer-specific registry system as described above in relation to FIG. 3.

Referring now to FIG. 7, display screen 700 may be generated and transmitted, e.g., over communications network 114 (FIG. 1A), to a gift registrant to allow them to add items to their centralized gift registry. Display screen 700 may be generated and transmitted, e.g., over communications network 114 (FIG. 1A), to a gift registrant when they click on one of the links 608 (FIG. 6). Display screen 700 includes a marketing message 704 relating to creating a centralized gift registry. Any suitable marketing message may appear in this area on display screen 700. In display screen 700, a gift registrant begins by naming their gift list (step 1), and then adding items to the registry (step 2). Gift registrants may add items from a particular retailer using link 716, or by clicking on the retailer logos 724. Each of the retailer names displayed in display screen 700 are registered marks of these retailers. Gift registrants may also add items from any retailer accessible via communications network 114 (FIG. 1A) using the add from anywhere link 730. Gift registrants may also add items by category using link 714, or by clicking on the images of gift items displayed by category 732. Suitable categories include dining 718, kitchen 720, and bed and bath 722. Each of these links, when selected, may involve the use of an API function call to a respective retailer-specific registry system as described above in relation to FIG. 2. Gift registrants may also add items from any retailer's catalog or retailer-specific registry accessible via communications network 114 (FIG. 1A) using the add from anywhere link 730.

FIG. 8 shows a display screen 800 that may be used to add items to a gift registrant's gift list. Display screen 800 may be used in addition to, or instead of, display screens 600 (FIG. 6) and 700 (FIG. 7). Display screen 800 may also be generated and transmitted, e.g., over communications network 114 (FIG. 1A), to a gift registrant if they click on a particular retailer logo 724 in display screen 700 (FIG. 7). Display screen 800 includes a retailer logo 810, and a link 808 to add gift items to the registry by category. Any suitable category names and/or category images may be displayed in section 804 of display screen 800. The category names and/or category images may be selected (e.g., by clicking on the names and/or images), such that other display screens are generated and transmitted, e.g., over communications network 114 (FIG. 1A), to the gift registrant when they click on these names and/or images. Toolbar 815 includes toolbar links 818 for adding items by a particular category. Suitable categories include bedding, bath, kitchen, table linens, storage, dining room, and living room. If a gift registrant selects one of these categories, centralized gift registry system 100 (FIG. 1A) may generate a display with the gift items associated with the selected category. Toolbar 815 may also include links for importing a registry, or viewing gift items via a styleboard link, or adding a cash gift as shown in display screen 800. Each of these links, when selected, may involve the use of an API function call to a respective retailer-specific registry system as described above in relation to FIG. 2.

Figure 10A:
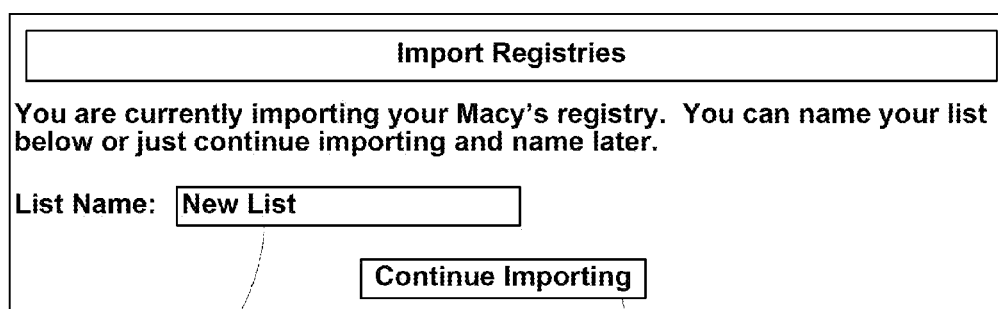
FIGS. 10A, 10B, and 10C illustrate several display screens with options for how a gift registrant may begin to import retailer-specific registry items into a centralized gift registry, according to illustrative embodiments.
Figure 10B:
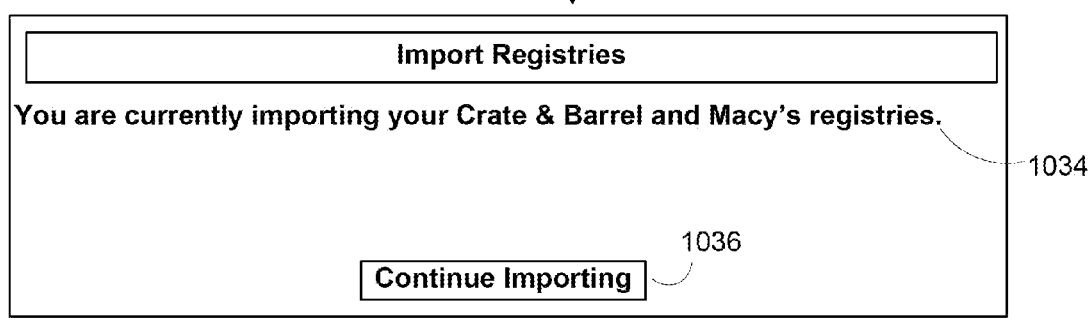
Figure 10C:
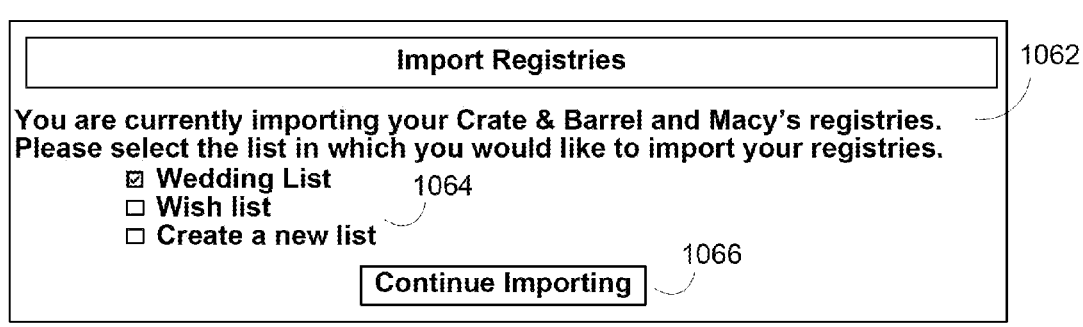

FIGS. 9, 10A, 10B, and 10C show illustrative display screens 900, 1000, 1030, and 1060, respectively. Each of these display screens may be generated by centralized gift registry system 100 (FIG. 1A) and transmitted to a gift registrant. Display screens 900, 1000, 1030, and 1060 may be used by a gift registrant to search for and import gift items from one or more retailer-specific registries into their centralized gift registry. FIG. 9 shows display screen 900 which includes options for a gift registrant to import retailer-specific registry gift items into their centralized gift registry stored on the centralized gift registry system 100 (FIG. 1A). FIGS. 10A, 10B, and 10C illustrate display screens that may be generated and transmitted, e.g., over communications network 114 (FIG. 1A), to a user while they are importing a retailer-specific registry. When the gift items are imported, which may involve the use of APIs (described in relation to FIG. 2), data associated with each gift item is stored by the centralized gift registry system 100 (FIG. 1A), e.g., using data structures such as data structures 300 and 350 (FIG. 3). When this importing process is complete, the selected retailer-specific registry is said to be imported (i.e., uploaded and merged) into the centralized gift registry.

With reference to FIG. 9, display screen 900 includes a message 902 to a gift registrant. In some embodiments, centralized gift registry system 100 (FIG. 1A) may automatically search for a gift registrant's retailer-specific registries or other gift registries accessible via communications network 114 (FIG. 1A). This search may be performed by querying a retailer-specific registry system using information previously collected from the gift registrant, e.g., their name, e-mail address, date of an event, etc. Furthermore, this search query may involve the use of an API function call to the retailer specific-registry as described above in relation to FIG. 2. Toolbar 904 presents the retailer-specific registries that were found during the search, and allows a gift registrant to select which of these gift items they would like to import (i.e., upload and merge) into their centralized gift registry. Optionally, a gift registrant may select that the gift items on the centralized gift registry and the retailer-specific registry systems be synchronized at all times. Synchronization is a process by which one of these registry systems makes a change to the gift list stored on their respective gift registry system based on changes that have been made to a gift list stored on another gift registry system. Synchronization may involve the use of API function calls as described above in relation to FIG. 3. Once this selection(s) has been made, a gift registrant may begin the importing process by selecting import link 908. Optionally, if a retailer-specific registry has not been found by the automatic search, a gift registrant may enter information 910 into the search boxes at the bottom of display screen 900 and select the find (retailer-specific) registries link 912.

With continued reference to FIGS. 9 and 10A-C, a gift registrant may select one or more retailer-specific registries using toolbar 904. Once these retailer-specific registries have been selected, a gift registrant may be allowed several options for importing them. Each of these options may involve the use of an API as described above in relation to FIG. 3. For example, display screen 1000 illustrates the importing of a MACY'S registry, allowing a gift registrant to name the gift list 1002 into which the MACY'S registry gift items will be imported. The gift registrant may continue importing their MACY'S registry by selecting the link 1004. Display screen 1030 illustrates the importing of two retailer-specific registries with a message 1034 displayed. The gift registrant may continue importing their retailer-specific registries by selecting the link 1036. Display screen 1060 illustrates a message 1062 that allows a gift registrant make a selection 1064 to add the items from one or more retailer-specific registries to their gift list, and then continue importing these retailer-specific registries by selecting link 1066. The importing process may be performed using API function calls as described above in relation to FIG. 3. During the importing process initiated in display screens 900, 1000, 1030, and 1060, data associated with each gift item is stored by the centralized gift registry system 100 (FIG. 1A), e.g., using data structures such as data structures 300 and 350 (FIG. 3).

FIG. 11 shows illustrative display screen 1100 that may be generated by centralized gift registry system 100 (FIG. 1A). Display screen 1100 provides a gift registrant with a plurality of options to view and/or modify gift items on their gift list. Display screen 1100 includes list title 1102 which includes a description of the centralized gift registry list, gift item sections 1124, 1126, 1128, and 1130, and toolbars 1104 and 1109. Toolbar 1104 includes links for changing personal settings 1106, managing the gift registrant's gift list 1107, managing a gift registrant's styleboards 1108, tools 1110 with links for importing registries or performing other tasks, and tools 1112 with links for adding gift items to the gift list of the centralized gift registry. Each gift item in sections 1124, 1126, 1128, and 1130 is displayed with associated information, e.g., the retailer that sells the gift item, the price of the gift item, and the desired quantity for the gift item. In this manner, a gift registrant or gift giver has sufficient information to make selections or decisions with respect to gift items on the gift list.

The links shown in toolbar 1104 may be similar to those described with respect to the display screens of FIGS. 4-10C. Each of the links in toolbar 1104 may allow the gift registrant to navigate to display screens that are generated by the centralized gift registry system 100 (FIG. 1A). Drop-down menu 1130 and toolbar 1109 allow a gift registrant to search through and/or filter gift items. For instance, toolbar 1109 allows a gift registrant to view and/or explore their centralized gift registry using centralized gift registry tags 1114 (e.g., kitchen, appliances), centralized gift registry categories 1116 (e.g., kitchen, bath), centralized gift registry item prices 1118, centralized gift registry gift item priority 1120 (e.g., high, medium, low), and centralized gift registry gift item status 1122 (e.g., purchased, or not purchased). In display screen 1100, drop-down menu 1130 has been selected to display gift items in the order that they were last added to the centralized gift registry. Upon a gift registrant's selection of a particular option for viewing/exploring the centralized gift registry gift items, centralized gift registry system 100 (FIG. 1A) may access gift item data structures 300 and 350 (FIG. 3) to search for items that match the selected viewing/exploring option.

A gift registrant may alter the information associated with a gift item when interacting with the display screen 1100. For example, with respect to gift item 1124, the quantity of the gift item 1124 may be changed, or the gift list associated with the gift item 1124 may be changed, or the visibility (a selection of which of a plurality of gift givers may view the gift item) of the gift item may be changed. A gift giver, when interacting with the centralized gift registry system, may view a display screen that is similar to display screen 1100.

FIGS. 12A and 12B show illustrative display screens 1200 and 1250, respectively, which may be used to add or modify a cash gift of a centralized gift registry. Display screen 1200 includes an advertisement message 1201 informing a gift registrant that they may register for a cash gift 1202. The gift registrant may then select a gift list 1204 to which they would like to add the cash gift, name their cash gift 1206, select the amount for their cash gift 1208 (e.g., $50), select a gift item priority 1210, select a gift item visibility 1212, and select a centralized gift registry tag(s) 1214 that are to be associated with the cash gift. For cash gifts, a gift registrant may have the option of entering account information for their bank account, or any other suitable account 1214 (e.g., credit card account, debit card account, "paypal" account), to which they would like the cash gift amount credited. Once the various options for the cash gift have been selected to the gift registrant's satisfaction, the gift registrant may add the cash gift to their selected gift list using the link 1216.

FIG. 12B shows a display screen 1250 which may allow a gift giver and/or a gift registrant to update or purchase a cash gift item from a gift list of a centralized gift registry. Display screen 1250 includes a display of gift items of the centralized gift registry. The display may be filtered according to any suitable options, e.g., by retailer 1252, by category 1254, by room, color, or styleboard 1256, by price 1258, or by priority 1260. Display screen 1250 includes three gift items of which gift item 1268 is a cash gift item. The cash gift item display allows a gift giver and/or gift registrant to contribute to the cash gift using link 1270. Those skilled in the art will realize that many variants of the display screens 1200 and 1250 may be generated and generated and transmitted, e.g., over communications network 114 (FIG. 1A), to the gift registrant. Display screens 1200 and 1250 may also be generated and transmitted, e.g., over communications network 114 (FIG. 1A), to gift givers and/or gift registrants for non-cash gifts.

We turn next to detailed descriptions of the processes which may be implemented using centralized gift registry system 100 (FIG. 1A). In summary, FIGS. 13A-F, 14A-B, 15A-B, and 16A-B show illustrative process flow diagrams for various processes relating to the creating a centralized gift registry, importing retailer-specific registry gift items into the gift list of the centralized gift registry system, and adding and synchronizing of gift items on the centralized gift registry. Each of these processes may be performed by CPU 106 (FIG. 1B) of centralized gift registry system 100 (FIG. 1A) using calls to one or more APIs as described in relation to FIG. 2, and may involve modifying data structures (e.g., structures 300 and 350 of FIG. 3) stored on the memory in storage 104a (FIG. 1A) of the centralized gift registry system 100 (FIG. 1A). In the descriptions that follow, the various steps in the process flow diagrams may be implemented in any order, and one or more of the steps in the process flow diagrams may be optional.

FIGS. 13A-13F are illustrative process flow diagrams for various embodiments of gift-list synchronization between one or more retailer-specific registries and a centralized gift registry, such as centralized gift registry system 100 (FIG. 1A). Each of the process flow diagrams indicates steps that are associated with the centralized gift registry (GR) 1302, and steps that are associated with the retailer 1304. While these steps may be described as being initiated by a user (i.e., a gift giver or a gift registrant), one skilled in the art will realized that the respective registry system will perform most, if not all, of the described steps. Each of these steps may involve the use of API function calls to the centralized gift registry and/or the retailer-specific registry, as described above with respect to FIG. 2. In each of the process flow diagrams, a horizontal dotted line separates the process steps associated with GR 1302 from the process steps associated with the retailer 1304.

Figure 13A:
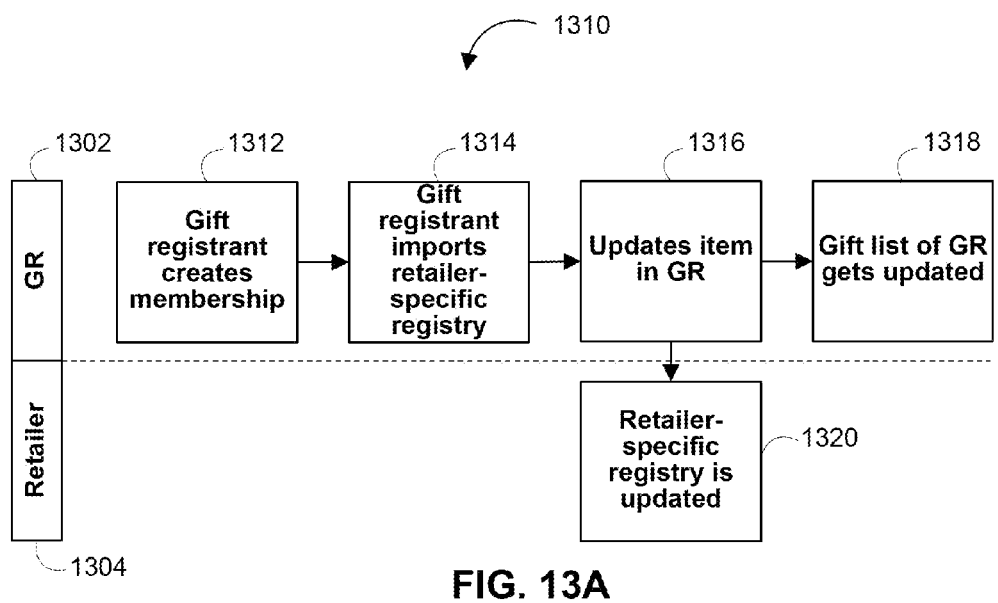
FIGS. 13A-F are process flow diagrams for the synchronization of gift items between one or more retailers and a centralized gift registry, according to illustrative embodiments.

FIG. 13A shows synchronization process flow diagram 1300, according to an illustrative embodiment. In this process, a gift registrant creates a membership account with the centralized gift registry system 100 (FIG. 1A). The centralized gift registry system 100 (FIG. 1A) may transmit a display similar to that in FIG. 4 to the gift registrant, thereby allowing the gift registrant to create a membership account by selecting a username and password (1312). Centralized gift registry system 100 (FIG. 1A) may then generate and transmit displays (e.g., web pages) similar to those in FIGS. 9 and 10A-C, allowing the gift registrant to import retailer-specific registries, i.e., to merge the gift items from one or more retailer-specific registries with the gift items, if any, associated with their membership account (1314). If the gift registrant updates a gift item on the gift list of their centralized gift registry (1316), or if an update is made to the gift item in another suitable manner, this update is made on the gift list of the centralized gift registry (1318). The gift item update is also transmitted from centralized gift registry system 100 (FIG. 1A) to the retailer-specific registry, which is subsequently updated to reflect the change to the gift item (1320). Gift item updates may include changing the quantity of the gift item requested, the price associated with a cash gift, or any other suitable change to a gift item on the gift list.

Figure 13B:
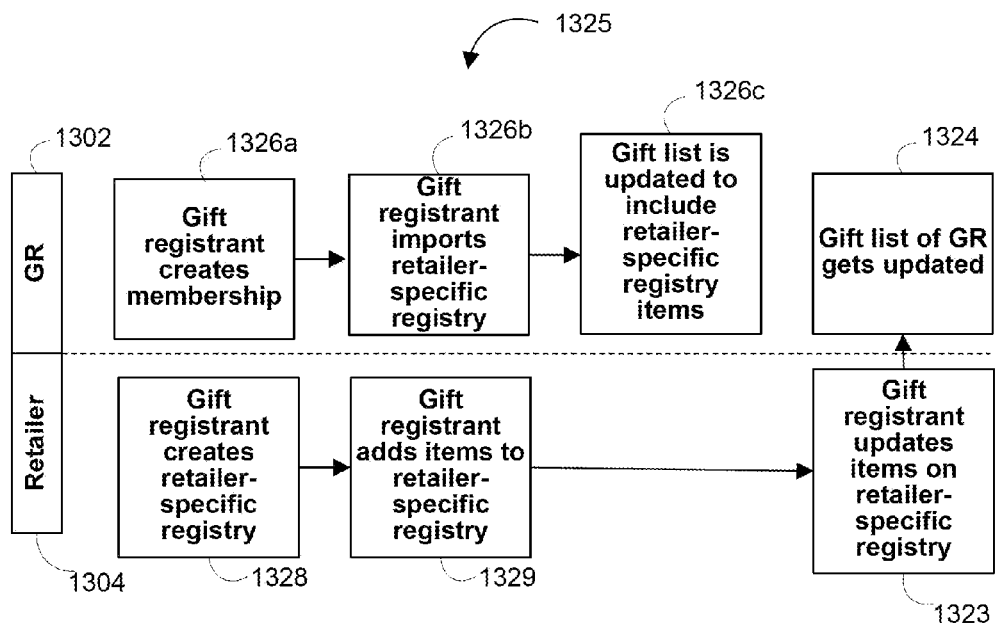

FIG. 13B shows synchronization process flow diagram 1325, according to an illustrative embodiment. In this process, a gift registrant creates a retailer-specific registry associated with a retailer system 134a (FIG. 1A) (1328). The gift registrant may add gift items to the retailer-specific registry (1329). A gift registrant may also import the retailer-specific registry, i.e., upload and merge the gift items from the retailer-specific registries with the gift items, if any, associated with their centralized gift registry (1326b, 1326c). The importing of gift items may involve function calls to API(s) associated with the centralized gift registry system 100 (FIG. 1A) or the retailer system 134a (FIG. 1A). Centralized gift registry system 100 (FIG. 1A) may generate and transmit displays (e.g., web pages) similar to those in FIGS. 9 and 10A-C to allow the gift registrant to import the retailer-specific registry. If a gift item on the gift list of the retailer-specific registry is made (1323), this update is also transmitted to the centralized gift registry system 100 (FIG. 1A). The gift list of the centralized gift registry (system) is subsequently updated to reflect the change to the gift item (1324).

Figure 13C:
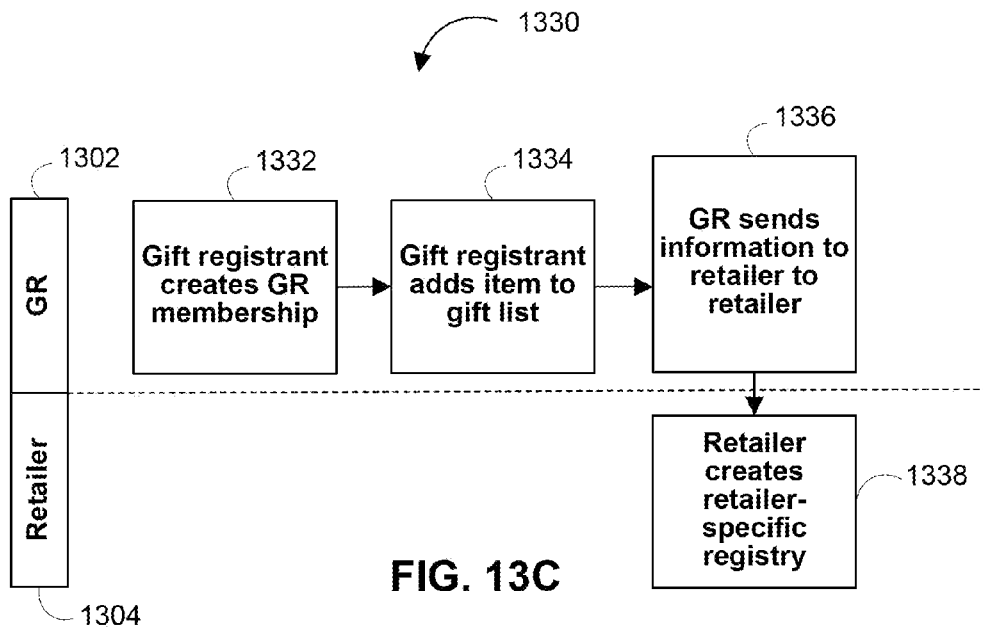

FIG. 13C shows synchronization process flow diagram 1330, according to an illustrative embodiment. In this process, a gift registrant creates a membership account with the centralized gift registry system 100 (FIG. 1A). The centralized gift registry system may transmit a display similar to that in FIG. 4 to the gift registrant, thereby allowing the gift registrant to create a membership account by selecting a username and password (1332). The gift registrant may add gift items to the gift list of the centralized gift registry (1334). These items may be added using function calls to API(s) associated with one or more retailer-specific registries. The centralized gift registry system 100 (FIG. 1A) may then send information about the gift registrant and/or gift items on the gift list to a particular retailer (1336). The information may be sent using an API function call to a respective registry system associated with the retailer. This information may be used by the retailer to create a retailer-specific registry for the gift registrant (1338). If an update to a gift item occurs on the centralized gift registry, this update is also transmitted to the retailer-specific registry, as described below with reference to FIG. 13D.

Figure 13D:
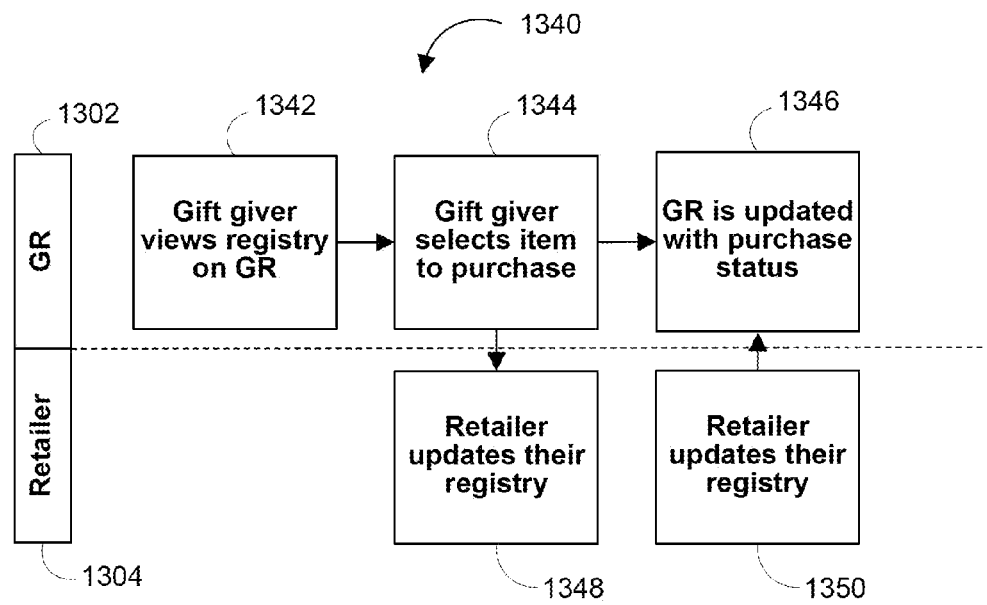

FIG. 13D shows synchronization process flow diagram 1340, according to an illustrative embodiment. In this process, a gift giver views gift items on a gift list of the centralized gift registry system 100 (FIG. 1A). To do so, the centralized gift registry system may transmit a display similar to those in FIG. 11 or 12B, which allow the gift giver to browse/filter/select gift items on the gift list of the centralized gift registry (1342). The filtering of gift items on the gift list may be accomplished by searching through data structures associated with the gift list, such as data structures 300 and 350 (FIG. 3). In one embodiment, the gift giver may then select a gift for purchase (1344), and the gift list of the centralized gift registry may be updated in response to the fulfillment of this purchase request (1346). In some embodiments, the purchase request is fulfilled by the centralized gift registry system 100 (FIG. 1A), e.g., using e-commerce server 103 (FIG. 1A). In some embodiments, the purchase request is transmitted to the retailer-specific registry, e.g., via communications network 114 (FIG. 1A). The retailer-specific registry system may then fulfill the purchase request, and generate and transmit a request to the centralized gift registry system 100 (FIG. 1A) to update the gift list of the centralized gift registry in response to the fulfillment of the purchase request. This request may be made via an API function call, as described above in relation to FIG. 2. The gift giver's selection may also be transmitted to the retailer-specific registry, allowing the gift list of the retailer-specific registry to be updated (1348). The selection may be transmitted using an API function call from the web/app server 102*a* of centralized gift registry system 100 to the retailer system 134*a* (FIG. 1A). In one embodiment, an update to a gift item of the retailer-specific registry is made (1350) and transmitted to the centralized gift registry, thereby allowing the gift list of the centralized gift registry to be updated (1346). Gift item updates may include changing the quantity of the gift item requested, the price associated with a cash gift, an indication that a purchase request for a gift item has been fulfilled, or any other suitable change to a gift item on the gift list.

Figure 13E:
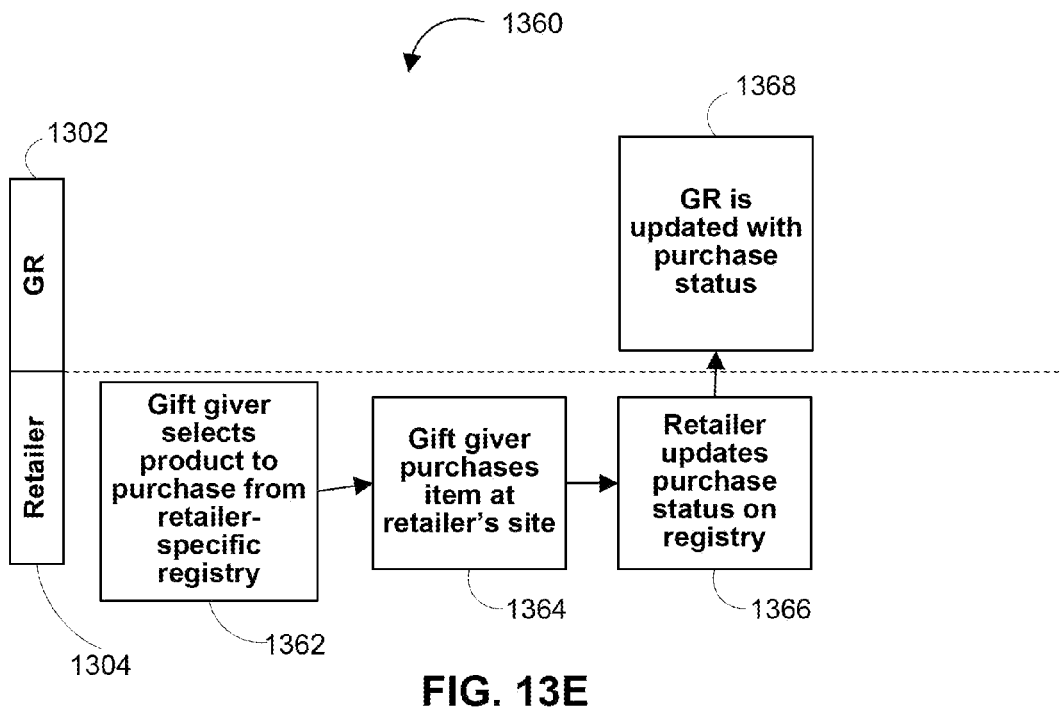
Figure 13F:
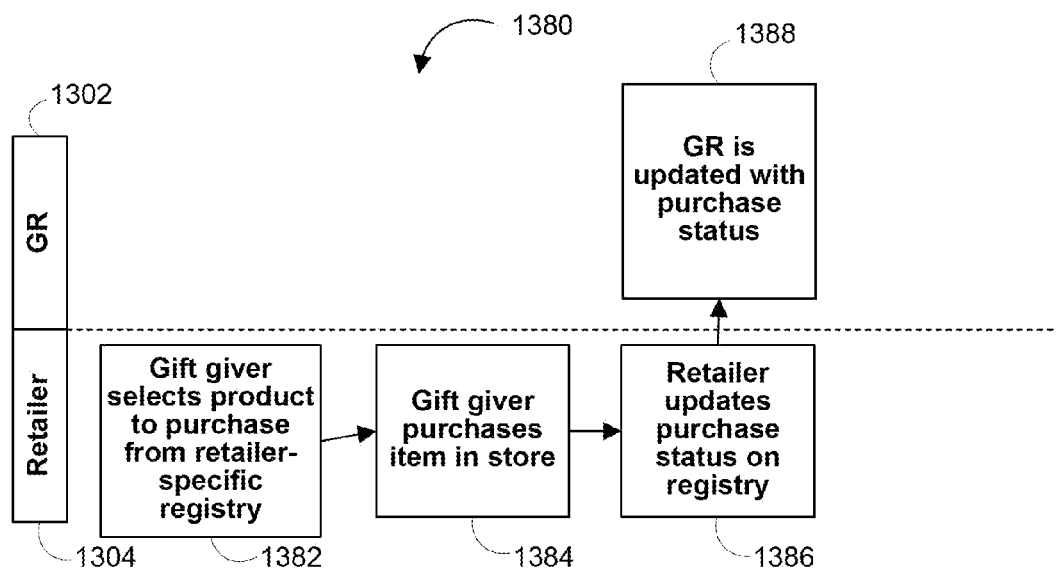

FIGS. 13E and 13F show synchronization process flow diagrams 1360 and 1380, respectively, according to an illustrative embodiment. In these processes, gift lists of a retailer-specific registry and a centralized gift registry are synchronized based at least in part on online purchases at the retailer-specific registry website (FIG. 13E) or in-store purchases at the retailer's store (FIG. 13F). With continued reference to FIGS. 13E and 13F, a gift giver selects a gift item to purchase from the gift list of the retailer-specific registry (1362, 1382). Such a selection may be performed online (1364), using, e.g., display screens similar to those in FIG. 11 or 12B. Alternatively, or additionally, the selection may be performed in the retailer store (1384). The retailer's system then updates the gift list on the retailer-specific registry (1366, 1386). Gift item updates may include changing the quantity of the gift item requested, the price associated with a cash gift, that a purchase request for a gift item has been fulfilled, or any other suitable change to a gift item on the gift list. For instance, the retailer's system may change the quantity of the gift item required, or remove the gift item from the gift list. This update is then transmitted to the centralized gift registry system 100 (FIG. 1A). The transmission may be performed using function calls to API(s) associated with the centralized gift registry system web/app server 104 (FIG. 1A). The gift list of the centralized gift registry system is then updated to reflect the change in the retailer-specific registry (1368, 1388).

Figure 14A:
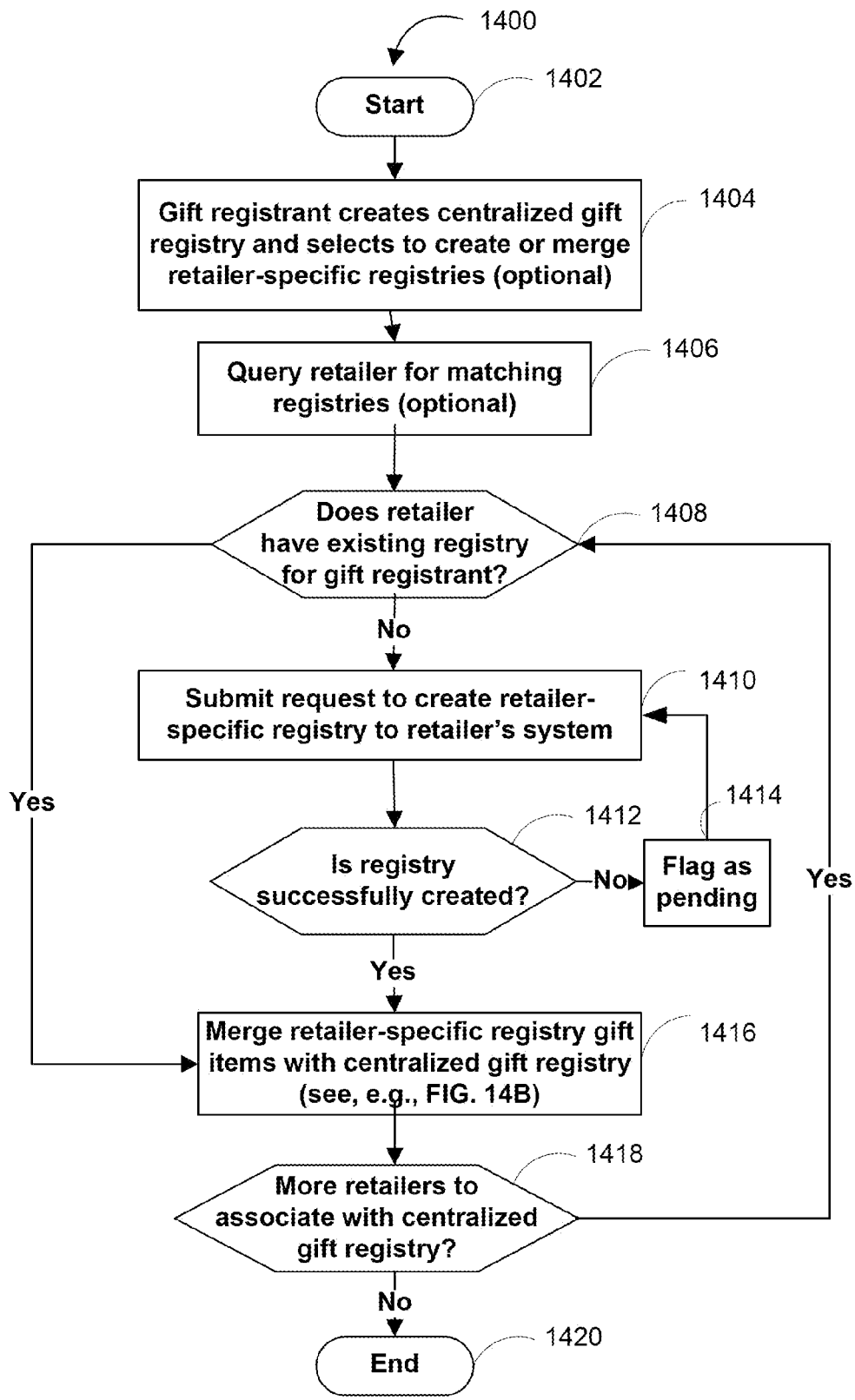
FIG. 14A is a process flow diagram for creating a centralized gift registry and merging gift items from a retailer-specific registry into a gift list of the centralized gift registry, according to an illustrative embodiment.

FIG. 14A illustrates a process flow diagram for process 1400 for creating a centralized gift registry, importing gift items from a retailer-specific registry into the centralized gift registry, and/or automatically creating a retailer-specific registry. The process starts (1402) with the gift registrant creating their centralized gift registry at the centralized gift registry system 100 (FIG. 1A). The centralized gift registry system 100 (FIG. 1A) may transmit a display similar to that in FIG. 4 to the gift registrant, thereby allowing the gift registrant to create a membership account by selecting a username and password. Centralized gift registry system 100 (FIG. 1A) may then generate and transmit displays (e.g., web pages) similar to those in FIGS. 9 and 10A-C, allowing the gift registrant to select to create and/or import retailer-specific registries, with the centralized gift registry. To do so, centralized gift registry system 100 (FIG. 1A) queries the retailers for information on retailer-specific registries that are associated with the gift registrant (1406). For instance, the first and last name of the gift registrant may be used to query retailers via an API function call, as described above with respect to FIG. 2. Furthermore, this step may be automatically performed by the CPU 106 (FIG. 1B) when a gift registrant creates a membership account at the centralized gift registry system 100 (FIG. 1A).

Centralized gift registry system 100 (FIG. 1A) then checks to see if a retailer's system has a retailer-specific registry for the gift registrant (1408). If a does have an existing registry, centralized gift registry system 100 (FIG. 1A) uploads and merges the gift items from the retailer-specific registry with the gift items, if any, associated with the gift registrant's membership account (1416). This uploading and merging may be performed using the process 1310 of FIG. 13A, or process 1450, to be described below with respect to FIG. 14B. If a retailer's system does not have an existing retailer-specific registry, centralized gift registry system 100 (FIG. 1A) submits a request (e.g., via a retailer system's API) to the retailer's system for creating the retailer-specific registry for the gift registrant (1410). If the centralized gift registry system 100 (FIG. 1A) determines, e.g., by using a retailer system's API function call (see FIG. 2), that the retailer-specific registry is successfully created (1412), then centralized gift registry system 100 (FIG. 1A) may subsequently merge the gift items from the retailer-specific registry with the gift items, if any, associated with the centralized gift registry (1416).

If the centralized gift registry system 100 (FIG. 1A) determines that the retailer-specific registry has not been created, then centralized gift registry system 100 (FIG. 1A) flags this retailer-specific registry as "pending" creation (1414), and attempts, periodically, to automatically resubmit a request (e.g., via a retailer system's API) to the retailer's system for creating a retailer-specific registry with a gift list for the gift registrant (1410). The period of these requests may be any suitable period, e.g., 15 seconds to 24 hours. These steps are repeated if there are more retailers with retailer-specific registries that need to be associated with the centralized gift registry or created because there is no existing retailer specific registry (1418). The process terminates if there are no more retailer-specific registries that need to be associated with the centralized gift registry (1420).

Figure 14B:
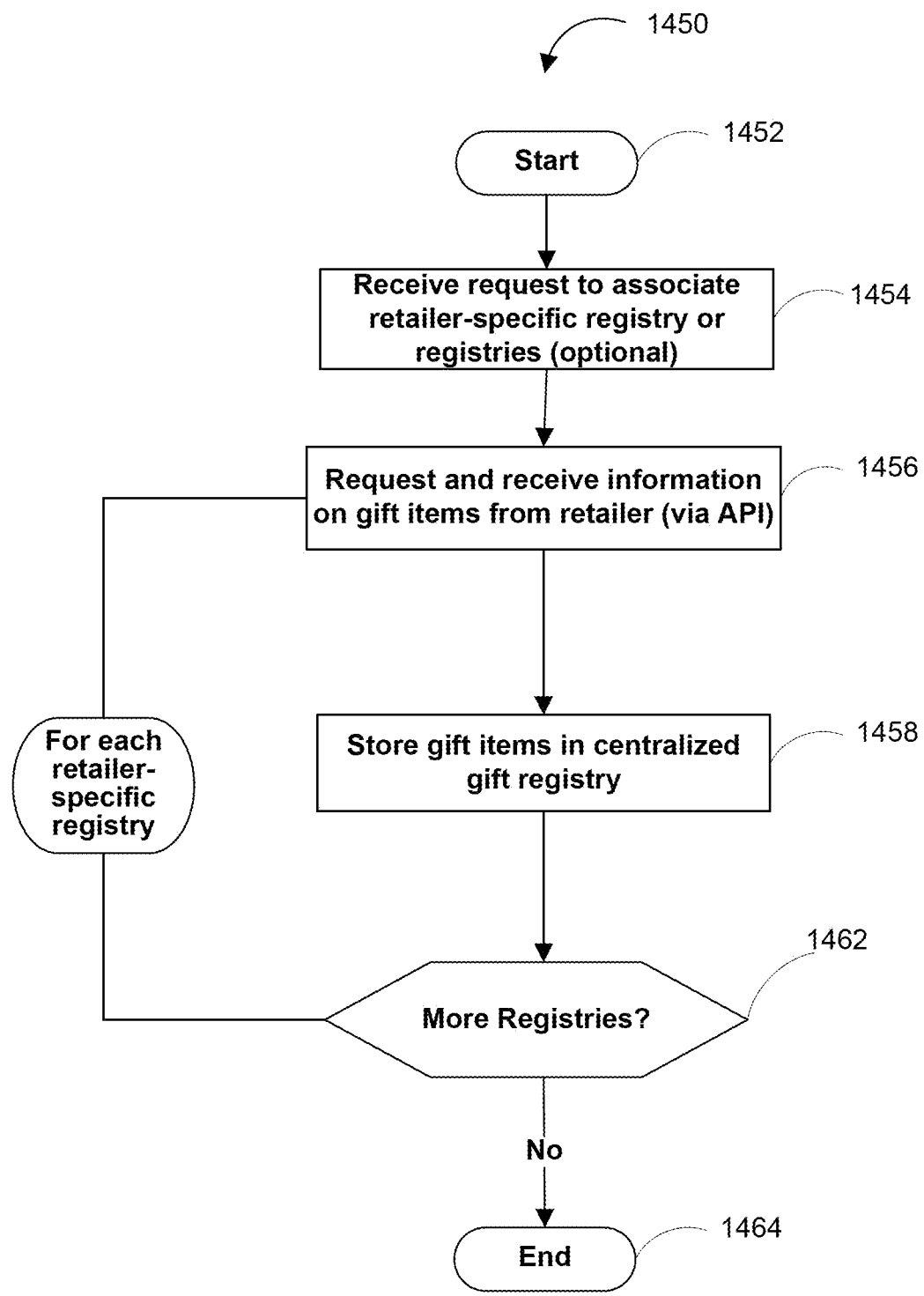
FIG. 14B is a process flow diagram for associating gift items from a retailer-specific registry into the gift list of a centralized gift registry, according to an illustrative embodiment.

FIG. 14B illustrates a process flow diagram for process 1450 for uploading and merging gift items from a retailer-specific registry into a centralized gift registry, such as that hosted by centralized gift registry system 100 (FIG. 1A). In some embodiments, process 1450 begins (1452) with the processor of the centralized gift registry system 100 (FIG. 1A) receiving a request to associate a retailer-specific registry with the centralized gift registry (1454). This request may be received as an API function call to the centralized gift registry system, as described above with respect to FIG. 2. In alternative embodiments, the process 1450 may begin with the processor automatically (i.e., without a request from the gift registrant) determining to begin importing a retailer-specific registry for the gift registrant into the centralized gift registry. In one embodiment, centralized gift registry system 100 (FIG. 1A) may generate and transmit displays (e.g., web pages) similar to those in FIGS. 9 and 10A-C, allowing the gift registrant to select to create and/or merge retailer-specific registries, with the centralized gift registry. For each retailer-specific registry (1462) to be associated (or uploaded and merged) with the centralized gift registry, centralized gift registry system 100 (FIG. 1A) requests (e.g., via an API for the retailer) and receives information on each gift item on the gift registrant's gift list of the retailer-specific registry (1456). For each gift item, the received gift item information is stored (e.g., in data structures 300 or 350 of FIG. 3) on the memory in storage 104a of the centralized gift registry system 100 (FIG. 1A) (1458). The process terminates (1464) when each gift item from each retailer-specific registry has been merged with the gift list of the centralized gift registry system 100 (FIG. 1A).

Figure 15A:
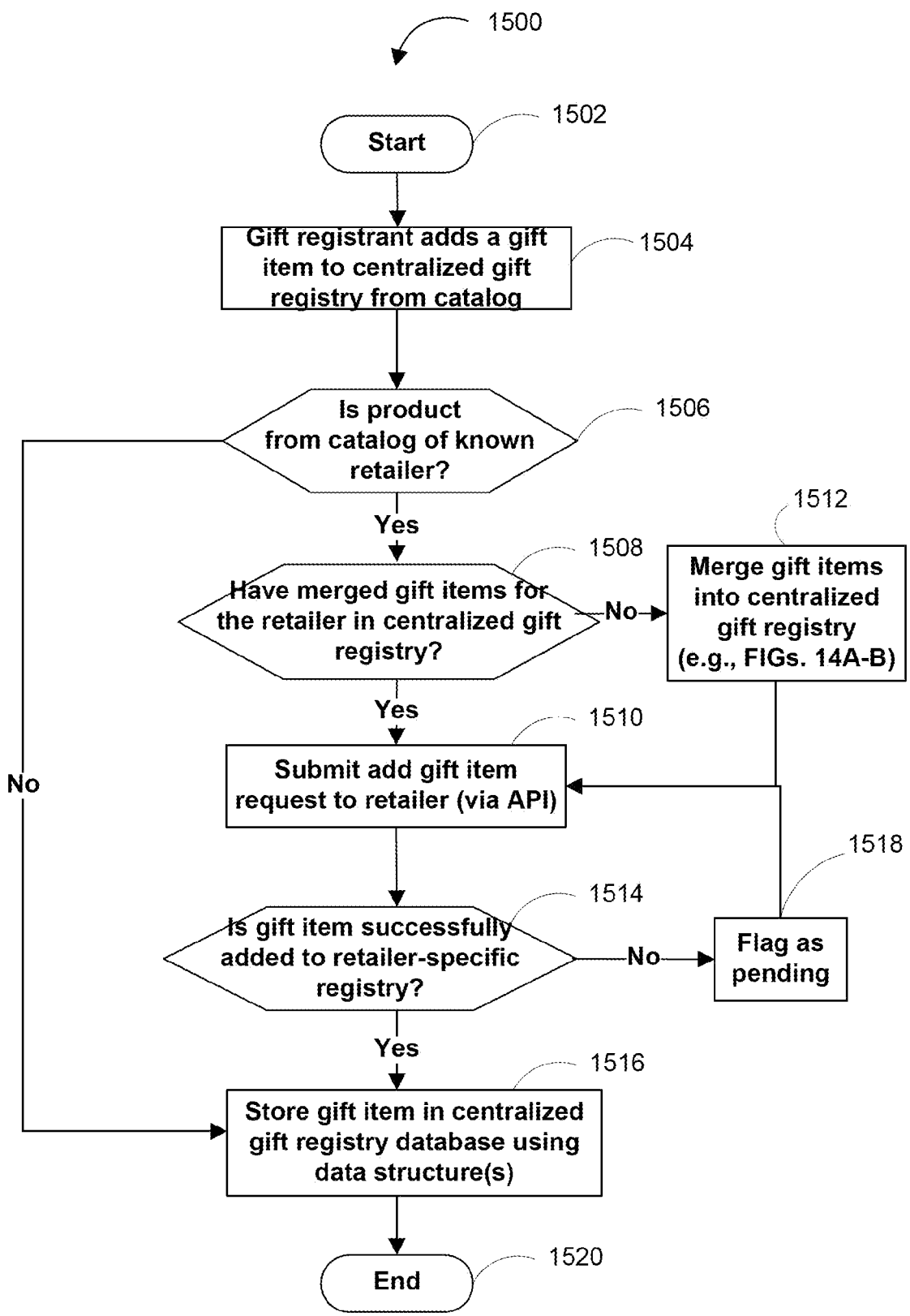
FIG. 15A is a process flow diagram illustrating a process by which a gift registrant may add gift items from a retailer's catalog into a centralized gift registry, according to an illustrative embodiment.

FIG. 15A illustrates a process flow diagram for process 1500 by which a gift registrant may add gift items from a retailer's catalog into their centralized gift registry stored on centralized gift registry system 100 (FIG. 1A). Process 1500 begins (1502) when a gift registrant selects (1504) a gift item from a retailer's catalog to add to their gift list on the centralized gift registry system 100 (FIG. 1A). Such a selection may be performed by the gift registrant interacting with display screens 600 (FIG. 6), 700 (FIG. 7), and 800 (FIG. 8). The centralized gift registry system 100 (FIG. 1A) determines (1506) if the product is from the catalog of a known retailer, i.e., a retailer that is either a business partner associated with the centralized gift registry system, or a retailer which has been associated with gift lists of the centralized gift registry system 100 (FIG. 1A) in the past. Those skilled in the art will appreciate that gift items from any retailer's system ("add from anywhere"), including a retailer's system that does not have a retailer-specific registry or a catalog may be selected and added to the gift list of the centralized gift registry system 100 (FIG. 1A).

If the centralized gift registry system 100 (FIG. 1A) determines that the retailer's system is already associated with the centralized gift registry system 100 (FIG. 1A), then the centralized gift registry system 100 (FIG. 1A) determines (1508) if the gift items from the retailer-specific registry have been merged into the gift registrant's gift list of the centralized gift registry system 100 (FIG. 1A). If the gift items have not been merged, centralized gift registry system 100 (FIG. 1A) merges these items into the gift registrant's gift list, e.g., using the processes 1400 or 1450 of FIGS. 14A and 14B, respectively (1512). If the centralized gift registry system 100 (FIG. 1A) determines that the retailer's retailer-specific registry is not already associated with the centralized gift registry system 100 (FIG. 1A), then the centralized gift registry system 100 (FIG. 1A) may request the respective retailer's system to create a retailer-specific registry for the gift registrant, as described below in FIG. 16C.

If the gift items have been merged into the gift registrant's gift list, or once they have been merged into the gift list via step 1512, the CPU 106 (FIG. 1B) of centralized gift registry system 100 (FIG. 1A) submits a request to add the gift item(s) to the retailer-specific registry (1510). This request may be made using an API function call to a retailer-specific registry system, as described above with respect to FIG. 2. If the gift item is successfully added to the retailer-specific registry (1514), or if at step 1506 the centralized gift registry system 100 (FIG. 1A) determines that the retailer-specific registry is not associated with the centralized gift registry, the information on the gift item is stored (1516) in the data structures (e.g., structures 300 and 350 of FIG. 3) of centralized gift registry system 100 (FIG. 1A). If the gift item is not successfully added to the retailer-specific registry, the gift item is flagged as pending (1518), and CPU 106 (FIG. 1B) of centralized gift registry system 100 (FIG. 1A) periodically submits a request to add the gift item(s) to the retailer-specific registry (1510). The period of these requests may be any suitable period, e.g., 15 seconds to 24 hours.

Figure 15B:
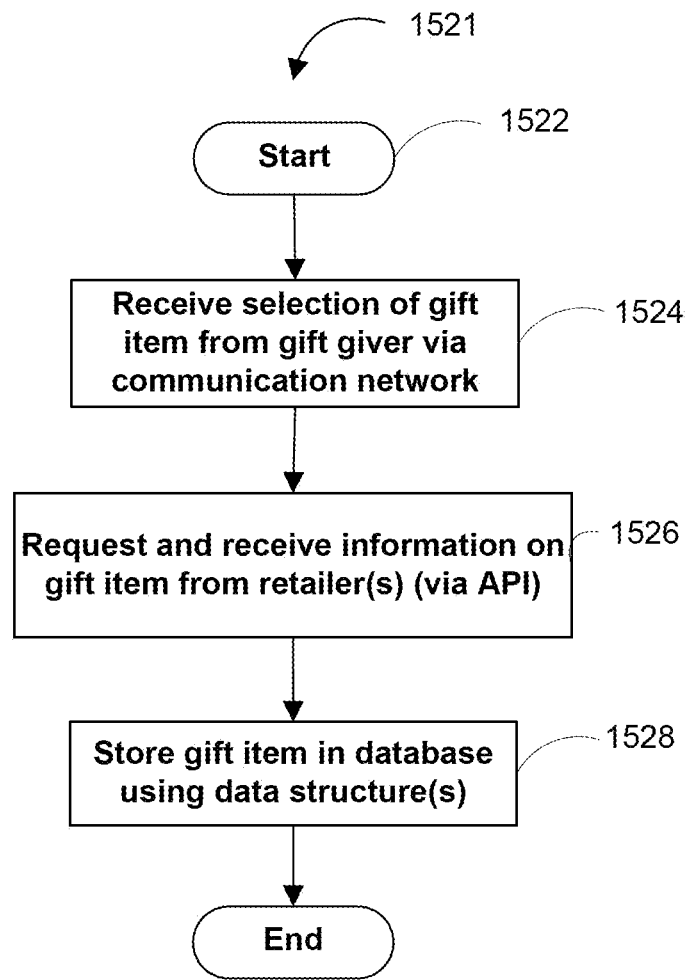
FIG. 15B is a process flow diagram illustrating a process by which a gift registrant may add gift items from a retailer's catalog into a centralized gift registry, according to an illustrative embodiment.

FIG. 15B illustrates a process flow diagram for process 1521 by which a gift giver may select gift items for purchase from a retailer, thereby causing an update to that gift item in a gift registrant's gift list stored on storage 104a (FIG. 1A) of a centralized gift registry system 100 (FIG. 1A). The process starts (1522) with the CPU 106 (FIG. 1B) of web/app server 102a of centralized gift registry system 100 (FIG. 1A) receiving (1524) a gift giver's selection of a gift item from a retailer's system over communications network 114 (FIG. 1A). Such a selection may be performed by the gift giver interacting with display screens 1100 (FIG. 6) or 1250 (FIG. 12B). The selection may be received via a function call from the retailer's system to the centralized gift registry system API, as described above with respect to FIG. 2. The CPU 106 (FIG. 1B) of web/app server 102a of centralized gift registry system 100 (FIG. 1A) then requests and receives (1526) information on the gift item from the retailer. This request may involve a retailer system's API function call, as described above with respect to FIG. 2. Process 1521 terminates with the CPU 106 (FIG. 1B) of web/app server 102a modifying the gift list of the centralized gift registry system 100 (FIG. 1A) with the received gift item information, and storing the gift list in storage 104a (FIG. 1A). The gift list may be stored in data structures such as those described above in relation to FIG. 3.

Figure 16A:
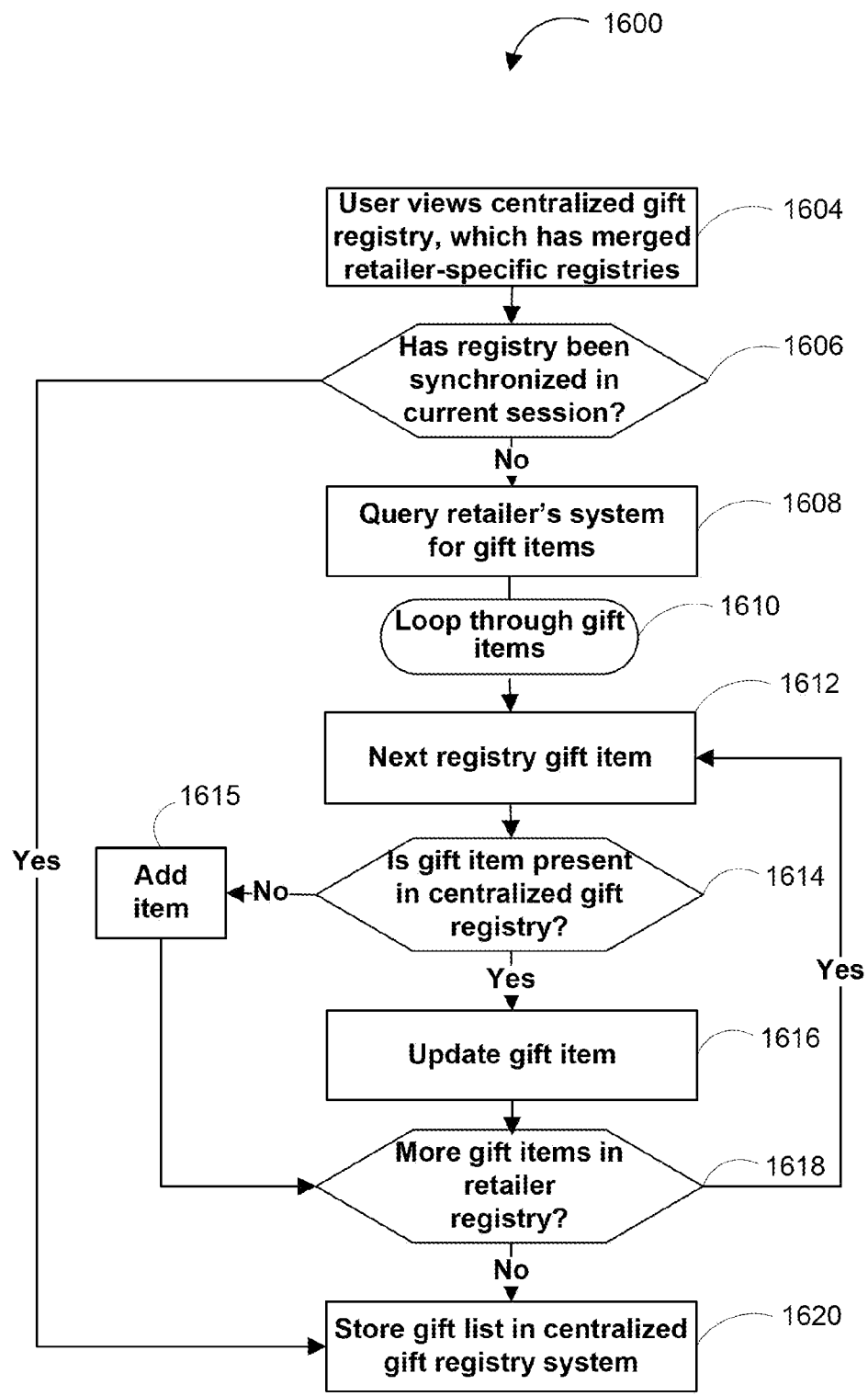
FIGS. 16A, 16B, and 16C are process flow diagrams illustrating processes that may be used to add and/or synchronize gift items common to a gift list of a retailer-specific registry and a centralized gift registry, according to an illustrative embodiment.
Figure 16B:
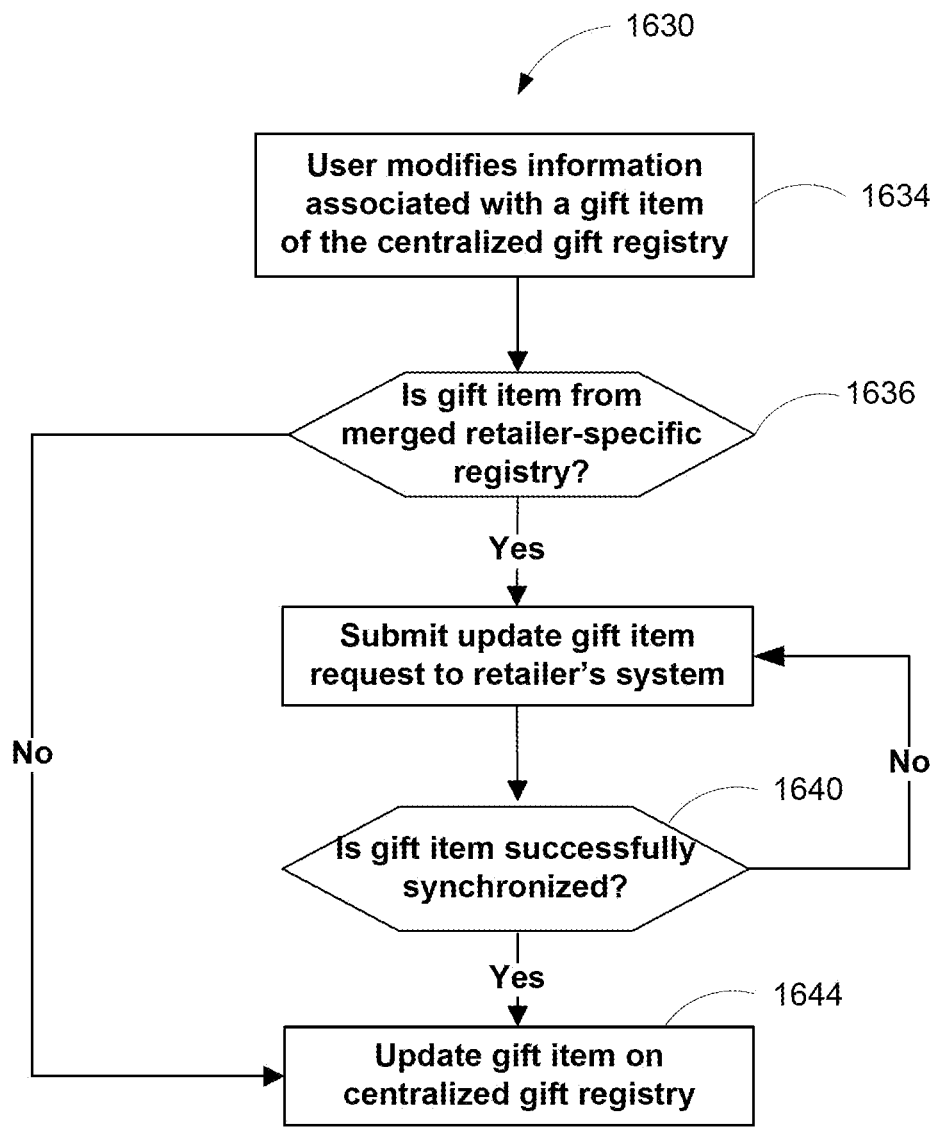

FIGS. 16A and 16B illustrate process flow diagrams for synchronization processes 1600 and 1630, respectively. Process 1600 is for synchronizing gift items on a gift list of a centralized gift registry system 100 (FIG. 1A) based at least in part on updates made to the gift items on the centralized gift registry system 100 (FIG. 1A) itself or on a retailer-specific registry that is separate from the centralized gift registry system 100 (FIG. 1A). A user (i.e., a gift registrant or a gift giver) views (1604) gift items on the gift list of the centralized registry system 100 (FIG. 1A), e.g., in displays (e.g., web pages) generated and transmitted to the user such as display screens 1100 (FIG. 6) or 1250 (FIG. 12B). CPU 106 (FIG. 1B) of centralized gift registry system 100 (FIG. 1A) then determines (1606) if the gift items on the gift list of the centralized registry have been synchronized with recent updates made to those gift items on a retailer-specific registry. If the gift list has been synchronized, the synchronized gift list is stored (1620) in storage 104a of centralized gift registry system 100 (FIG. 1A). On the other hand, if the gift list has not been synchronized, CPU 106 (FIG. 1B) of web/app server 104a,b of centralized gift registry system 100 (FIG. 1A) may request and receive information on the gift items pertaining to a retailer-specific registry from the retailer's system (1608). This request may involve an API function call to a respective registry system associated with the retailer-specific registry, as discussed above with respect to FIG. 2. For each gift item (1610, 1612, 1618), CPU 106 (FIG. 1B) of web/app server 104a,b of centralized gift registry system 100 (FIG. 1A) determines if the gift item is included on the gift list of the centralized gift registry (1614). If the gift item is included on the gift list, then the data structure associated with the gift item (e.g., data structure 350 of FIG. 3) is updated (1616) based on any gift item information received. If the gift item is not included on the gift list of the centralized gift registry, CPU 106 (FIG. 1B) of centralized gift registry system 100 (FIG. 1A) will create or modify an appropriate data structure to store information pertaining to the gift item to be added (1615). Once the data structure associated with each added gift item has been created, modified, or updated, the synchronized gift list is stored (1620) in storage 104*a* of centralized gift registry system 100 (FIG. 1A).

FIG. 16B illustrates process 1630 for synchronizing gift items on a gift list of a retailer-specific registry based at least in part on changes or updates made to the gift items by a user interacting with the centralized gift registry system 100 (FIG. 1A). A user (i.e., a gift registrant or a gift giver) modifies (1634) gift items on the gift list of the centralized registry system 100 (FIG. 1A), e.g., in displays (e.g., web pages) generated and transmitted to the user such as display screens 1100 (FIG. 6) or 1250 (FIG. 12B). Modifications may include, e.g., changes to the quantities of a gift item, changes in the retailer for a gift item, a change in the retailer associated with the gift item, etc. CPU 106 (FIG. 1B) of centralized gift registry system 100 (FIG. 1A) then determines (1636) if the gift items on the gift list of the centralized registry are gift items that are also included in a retailer-specific registry. If these items are on a gift list of the retailer-specific registry, CPU 106 (FIG. 1B) of centralized gift registry system 100 (FIG. 1A) submits a request to the retailer's system to update the gift item to reflect the modifications made by the user (1638). Such a request may be made using an API associated with the retailer.

CPU 106 (FIG. 1B) of centralized gift registry system 100 (FIG. 1A) then determines if the updates to the gift item have been made successfully (1640). If the updates have not been made successfully (or if the gift item has been synchronized), CPU 106 (FIG. 1B) of centralized gift registry system 100 (FIG. 1A) may periodically re-request the retailer's system to update the gift item to reflect the modifications made by the user (1638), until it determines that the update has been successfully made. This determination may involve the use of the retailer's system and/or centralized gift registry system API. For instance, CPU 106 (FIG. 1B) of centralized gift registry system 100 (FIG. 1A) may request information on the gift item that was to be updated, and if the information has not been updated, CPU 106 (FIG. 1B) of centralized gift registry system 100 (FIG. 1A) will determine that the update has not been made successfully. Once the update has been successfully made, the CPU 106 (FIG. 1B) of centralized gift registry system 100 (FIG. 1A) updates the gift list of the centralized gift registry to reflect the modifications (1644). At step 1636, if the gift item is not on a gift list of the retailer-specific registry, CPU 106 (FIG. 1B) of centralized gift registry system 100 (FIG. 1A) updates the gift list of the centralized gift registry to reflect the modifications (1644).

Figure 16C:
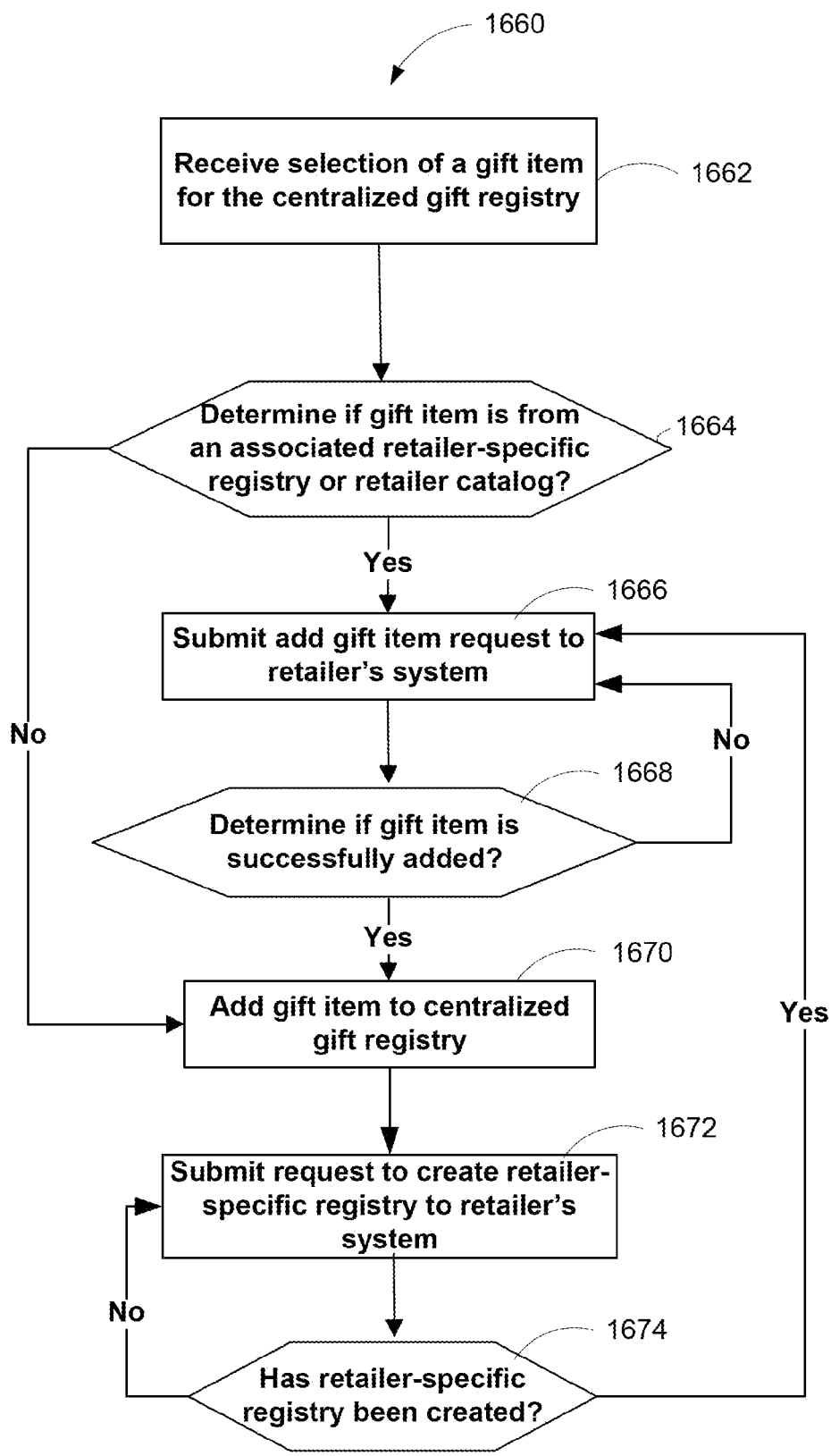

FIG. 16C illustrates process 1660 for adding gift items to centralized gift registry of the centralized gift registry system 100 (FIG. 1A), and creating and/or synchronizing the added gift item with an associated retailer-specific registry. CPU 106 (FIG. 1B) of centralized gift registry system 100 (FIG. 1A) receives a selection of a gift item to be added to the gift list of the centralized gift registry system (1662). The selection may be received from a user (i.e., a gift registrant or a gift giver), e.g., in displays (e.g., web pages) generated and transmitted to the user such as display screens 1100 (FIG. 6) or 1250 (FIG. 12B). CPU 106 (FIG. 1B) of centralized gift registry system 100 (FIG. 1A) then determines (1664) if the gift items on the gift list of the centralized registry are gift items that are also included in an associated retailer-specific registry. If these gift items are on a gift list of the associated retailer-specific registry, CPU 106 (FIG. 1B) of centralized gift registry system 100 (FIG. 1A) submits a request to the retailer's system to add the gift items to their retailer-specific registry (1666). Such a request may be made using an API function call to the retailer's system. CPU 106 (FIG. 1B) of centralized gift registry system 100 (FIG. 1A) then determines if the additions of the gift items have been made successfully (1668). If the additions have not been made successfully (or if the gift item has been synchronized), CPU 106 (FIG. 1B) of centralized gift registry system 100 (FIG. 1A) may periodically re-request the retailer's system to update the gift items to reflect the additions of the gift items, until CPU 106 (FIG. 1B) determines that the update has been successfully made (1668). This determination may involve the use of an API function call to the retailer-specific registry system. For instance, CPU 106 (FIG. 1B) of centralized gift registry system 100 (FIG. 1A) may request information on the gift item from the retailer, and if the information does not match the information associated with the addition of the gift items, CPU 106 (FIG. 1B) of centralized gift registry system 100 (FIG. 1A) will determine that the additions have not been made successfully. Once the additions have been successfully made, the CPU 106 (FIG. 1B) of centralized gift registry system 100 (FIG. 1A) adds the gift items to the gift list of the centralized gift registry (1670).

At step 1664 of process 1660 in FIG. 16C, if the gift item is not on a gift list of the retailer-specific registry, CPU 106 (FIG. 1B) of centralized gift registry system 100 (FIG. 1A) adds the gift items to the gift list of the centralized gift registry (1670), and submits a request to the retailer's system to create a retailer-specific registry including the added gift item (1672). Such a request may be made by generating and transmitting an API function call to the retailer's system, as described above with respect to FIG. 2. CPU 106 (FIG. 1B) of centralized gift registry system 100 (FIG. 1A) then determines if the retailer-specific registry has been created (1674). Such a determination may be made by generating and transmitting an API function call to the retailer's system, as described above with respect to FIG. 2. If the retailer-specific registry has not been created, CPU 106 (FIG. 1B) of centralized gift registry system 100 (FIG. 1A) may periodically re-request the retailer's system to create the retailer-specific registry, until it determines that the retailer-specific registry has been created (1674). If CPU 106 (FIG. 1B) of centralized gift registry system 100 (FIG. 1A) determines that the retailer-specific registry has been created, then CPU 106 (FIG. 1B) of centralized gift registry system 100 (FIG. 1A) submits a request to the retailer's system to add the gift items to their retailer-specific registry (1666), and process 1660 continues as described above.

Generally, the methods described herein may be executed on a conventional data processing platform such as an IBM PC-compatible computer running the Windows operating systems, a SUN workstation running a UNIX operating system or another equivalent personal computer, server, or workstation. Alternatively, the system may include a dedicated processing system that includes an API programming environment.

The methods described herein may also be realized as a software component operating on a conventional data processing system such as a UNIX workstation. In such an embodiment, the methods may be implemented as a computer program written in any of several languages well-known to those of ordinary skill in the art, such as (but not limited to) C, C++, FORTRAN, Java, MySQL, Perl, Python, Apache or BASIC. The methods may also be executed on commonly available clusters of processors, such as Western Scientific Linux clusters.

The methods disclosed herein may be performed in either hardware, software, or any combination thereof, as those terms are currently known in the art. In particular, the present method may be carried out by software, firmware, or microcode operating on a computer or computers of any type. Additionally, software embodying the processes described herein may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Accordingly, the systems and methods described herein are not limited to any particular platform, unless specifically stated otherwise in the present disclosure.

The systems and methods disclosed herein may be embodied in other specific forms without departing from the spirit or essential characteristics thereof. The foregoing embodiments are therefore to be considered in all respects illustrative, rather than limiting of the disclosure.

What is claimed is:

1. A centralized gift registry system comprising:
   a centralized gift registry including a gift common to the centralized gift registry and at least one retailer-specific registry of a gift registrant, wherein the centralized gift registry comprises gifts of a plurality of retailers and the common gift is merged with the centralized gift registry from the at least one retailer-specific registry;
   a memory for storing the centralized gift registry; and
   a network interface for communicating with a communications network, the communications network accessible to the at least one retailer-specific registry, a gift giver and the gift registrant;
   a processor in communication with the memory and the network interface, the processor configured to:
      receive a request to update the gift;
      send a request to update the gift to the respective retailer-specific registry;
      modify the centralized gift registry to include the update to the gift, thereby synchronizing the gift common to the respective retailer-specific registry and the centralized gift registry.

2. The system of claim 1, wherein an update includes a change in the desired quantity of the gift.

3. The system of claim 1, wherein an update includes an addition of the gift to a respective registry.

4. The system of claim 3, wherein the processor is further configured to:
   determine one of a plurality of retailer-specific registries associated with the gift to be added to the respective registry; and
   send the request to update the gift to the respective retailer-specific registry in response to the determination.

5. The system of claim 1, wherein an update includes a decrease in the desired quantity of the gift based at least in part on a purchase request.

6. The system of claim 5, wherein the purchase request is initiated at the respective retailer-specific registry, and the processor is further configured to:
   modify the centralized gift registry in response to receiving an indication of the fulfillment of the purchase request.

7. The system of claim 1, wherein the processor is further configured to:
   generate a gift list display; and
   transmit the gift list display over the communications network to at least one of the gift giver and the gift recipient.

8. The system of claim 1, wherein the processor is further configured to:
   receive a selection, by the gift registrant, of a gift to be added to the centralized gift registry;
   receive a selection, by one of the gift registrant and the gift giver, of a desired quantity of the selected gift; and
   modify the centralized gift registry to include the selected gift and the desired quantity.

9. The system of claim 8, wherein modifying the centralized gift registry includes associating a gift item data structure stored in the memory with the selected gift.

10. The system of claim 8, wherein the processor is further configured to:
    send a request to create a respective retailer-specific registry including the selected gift, if the respective retailer-specific registry does not exist.

11. The system of claim 1, wherein the update occurs in near real-time.

12. The system of claim 1, wherein the update occurs periodically.

13. The system of claim 11, wherein the period is less than approximately twenty four hours.

14. The system of claim 1, wherein the centralized gift registry includes a gift from a retailer's catalog.

15. The system of claim 14, wherein the processor is further configured to:
    send a request to create a respective retailer-specific registry, the retailer-specific registry including the gift from the retailer's catalog.

16. The system of claim 1, wherein the memory stores an application programming interface (API), and the processor sends the request via an API function call.

17. The system of claim 16, wherein the request is received in near real-time.

18. The system of claim 16, wherein the processor is further configured to identify the centralized gift registry system via the API function call.

19. The system of claim 18, wherein
    the API function call includes a public key, and
    a private key associated with a centralized gift registry system is used to digitally sign the API function call, and
    a retailer-specific registry system is configured to:
       determine, based at least in part on the digital signature of the API function call, the identity of the centralized gift registry system.

20. The system of claim 1, wherein the processor is further configured to send the request by generating an API function call to the respective retailer-specific registry system.

21. The system of claim 20, wherein the request is sent in near real-time.

22. The system of claim 21, wherein gift items of the centralized gift registry are stored in a data structure of the memory.

23. A method implemented on a centralized gift registry system including a centralized gift registry having at least one gift common to the centralized gift registry and at least one retailer-specific registry of a gift registrant, and a communications network accessible to the centralized gift registry system, the at least one retailer, a gift giver and the gift registrant, the method comprising:

a processor receiving a request to update the gift;
the processor sending a request to update the gift to the respective retailer-specific registry; and
the processor modifying the centralized gift registry to include the update to the gift, thereby synchronizing the gift common to the respective retailer-specific registry and the centralized gift registry,
wherein the centralized gift registry comprises gifts of a plurality of retailers and the common gift is merged with the centralized gift registry from the at least one retailer-specific registry.

24. The method of claim 23, wherein an update includes a change in the desired quantity of the gift.

25. The method of claim 23, wherein an update includes an addition of the gift to a respective registry.

26. The method of claim 25, further comprising:
the processor determining one of a plurality of retailer-specific registries associated with the gift to be added to the respective registry; and
the processor sending the request to update the gift to the respective retailer-specific registry in response to the determining.

27. The method of claim 23, wherein an update includes a decrease in the desired quantity of the gift based at least in part on a purchase request.

28. The method of claim 27, wherein the purchase request is initiated at the respective retailer-specific registry, further comprising:
the processor modifying the centralized gift registry in response to receiving an indication of the fulfillment of the purchase request.

29. The method of claim 23, further comprising:
the processor generating a gift list display; and
the processor transmitting the gift list display over the communications network to at least one of the gift giver and the gift recipient.

30. The method of claim 23, further comprising:
the processor receiving a selection, by the gift registrant, of a gift to be added to the centralized gift registry;
the processor receiving a selection, by one of the gift registrant and the gift giver, of a desired quantity of the selected gift; and
the processor modifying the centralized gift registry to include the selected gift and the desired quantity.

31. The method of claim 30, wherein modifying the centralized gift registry includes
the processor associating a gift item data structure stored in the memory with the selected gift.

32. The method of claim 30, further comprising:
the processor sending a request to create a respective retailer-specific registry including the selected gift, if the respective retailer-specific registry does not exist.

33. The method of claim 23, wherein the update occurs in near real-time.

34. The method of claim 23, wherein the update occurs periodically.

35. The method of claim 34, wherein the period is less than approximately twenty four hours.

36. The method of claim 23, wherein the centralized gift registry includes a gift from a retailer's catalog.

37. The method of claim 36, further comprising:
the processor sending a request to create a respective retailer-specific registry, the retailer-specific registry including the gift from the retailer's catalog.

38. The method of claim 23, wherein a memory of the centralized gift registry system stores an application programming interface (API), further comprising:
the processor sending the request via an API function call.

39. The method of claim 38, wherein the request is received in near real-time.

40. The method of claim 38, further comprising:
the processor identifying the centralized gift registry system via the API function call.

41. The method of claim 40, wherein
the API function call includes a public key, and
a private key associated with the centralized gift registry system is used to digitally sign the API function call, further comprising:
a retailer-specific registry system determining, based at least in part on the digital signature of the API function call, the identity of the centralized gift registry system.

42. The method of claim 1, further comprising:
the processor sending the request by generating an API function call to the respective retailer-specific registry system.

43. The method of claim 42, wherein the request is sent in near real-time.

44. The method of claim 23, wherein gift items of the centralized gift registry are stored in a data structure of a memory of the centralized gift registry system.

* * * * *